United States Patent
Futaki et al.

(10) Patent No.: US 8,259,701 B2
(45) Date of Patent: Sep. 4, 2012

(54) WIRELESS COMMUNICATION SYSTEM, ITS BASE STATION AND MOBILE STATION, COMMUNICATION SYNCHRONIZATION MANAGEMENT METHOD AND TIMER CONTROL PROGRAM THEREFOR

(75) Inventors: Hisashi Futaki, Minato-ku (JP); Jinsock Lee, Minato-ku (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 12/525,722

(22) PCT Filed: Feb. 1, 2008

(86) PCT No.: PCT/JP2008/051685
§ 371 (c)(1),
(2), (4) Date: Aug. 4, 2009

(87) PCT Pub. No.: WO2008/096683
PCT Pub. Date: Aug. 14, 2008

(65) Prior Publication Data
US 2010/0020786 A1 Jan. 28, 2010

(30) Foreign Application Priority Data
Feb. 5, 2007 (JP) ................................. 2007-026203

(51) Int. Cl.
*H04J 3/06* (2006.01)
(52) U.S. Cl. ...................................................... 370/350
(58) Field of Classification Search .................... 370/350
See application file for complete search history.

(56) References Cited

U.S. PATENT DOCUMENTS

| 8,077,694 B2* | 12/2011 | Doss et al. ..................... 370/347 |
| 2002/0012321 A1* | 1/2002 | Rune et al. ..................... 370/252 |
| 2002/0155862 A1 | 10/2002 | Ormson |
| 2007/0173279 A1 | 7/2007 | Kuroda et al. |
| 2008/0025314 A1* | 1/2008 | Lee et al. ........................ 370/394 |
| 2009/0141701 A1* | 6/2009 | Dalsgaard ..................... 370/350 |

(Continued)

FOREIGN PATENT DOCUMENTS

| JP | 2002-335210 A | 11/2002 |
| JP | 2007-195076 A | 8/2007 |

OTHER PUBLICATIONS

"Uplink Timing Control", Motorola, 3GPP TSG RAN1 #47-bis, R1-070045, Jan. 15-19, 2006, pp. 1 and 2, Sorrento, Italy.

(Continued)

*Primary Examiner* — Kenny Lin
(74) *Attorney, Agent, or Firm* — Sughrue Mion, PLLC

(57) ABSTRACT

A wireless communication system is provided for reducing the probability that latency before data transmission increases when a mobile station that is actually in sync is judged to be out of sync. A base station causes the timing calculation part to calculate the timing advance (TA) of a transmit timing from the $m^{th}$ mobile station; causes the timer adaptive control part to obtain the traveling speed or the time variation in TA of the $m^{th}$ mobile station and, adaptively determines and outputs as the timer update information the length of the $m^{th}$ first timer within an M number in total of synchronization timers and the length of the second timer of the $m^{th}$ mobile station and update the length of the $m^{th}$ first timer; and transmits from the downlink transmission part a downlink signal which contains timer update information.

7 Claims, 21 Drawing Sheets

U.S. PATENT DOCUMENTS

2009/0291717 A1* 11/2009 Lee et al. ............... 455/574
2010/0061302 A1* 3/2010 Ishii et al. ............... 370/328

OTHER PUBLICATIONS

"Uplink synchronization", NTT DoCoMo, Inc., 3GPP TSG RAN WG2 #56, R2-063401, Nov. 6-10, 2006, pp. 1-3, Riga Lativia.

"UL Timing Control Accuracy and Update Rate", Nokia, 3GPP TSG RAN WG1 #47, R1-063377, Nokia, Nov. 6-10, 2006, pp. 1-3, Riga, Lativa.

"Considerations on E-UTRA Uplink Time Synchronization", Siemens, 3GPP TSG-RAN WG1 #47, R1-063405, Nov. 6-10, 2006, pp. 1-5, Riga, Latvia.

* cited by examiner $P_i$: RECEIVE SIGNAL VECTOR OF THE iTH PILOT SYMBOL $\theta$: AMOUNT OF PHASE ROTATION FIG. 5
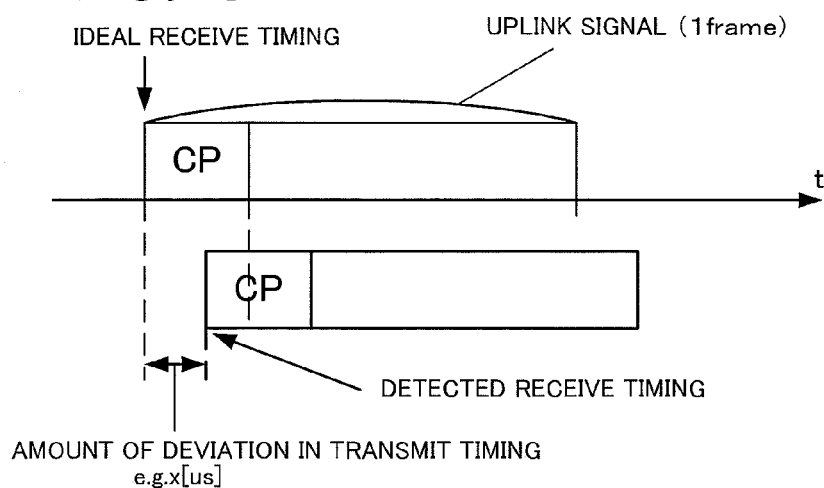
FIG. 6
CORRELATION BETWEEN
TRAVELING SPEED AND TIMER
| TRAVELING SPEED v[km/h] | TIMER $T_{TM}$[sec] |
|---|---|
| [0, 5) | 107.5 |
| [5, 30) | 17.9 |
| [30, 120) | 4.5 |
| [120, 350) | 1.5 |
| [350, ∞) | 1.1 |
FIG. 7
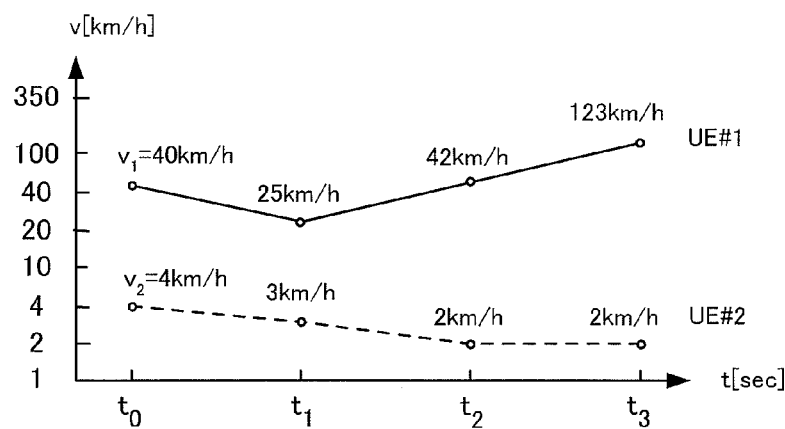

FIG. 10
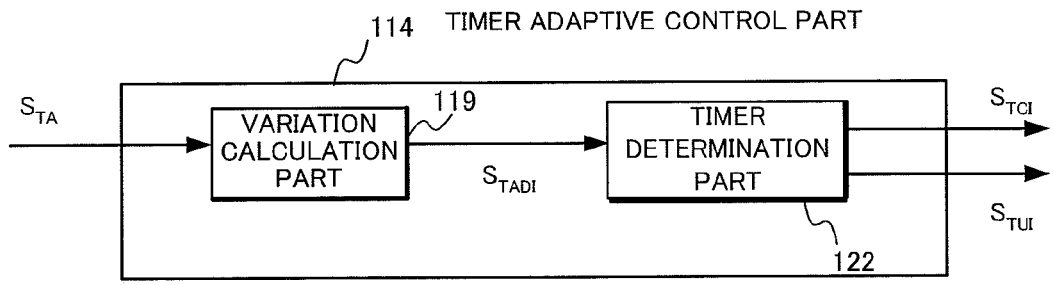
FIG. 11
CORRELATION BETWEEN TA VARIATION AND TIMER
| TA VARIATION $v$[us/10sec] | TIMER $T_{TM}$[sec] |
|---|---|
| [0, 0.10) | 107.5 |
| [0.10, 0.58) | 17.9 |
| [0.56, 2.23) | 4.5 |
| [2.23, 6.51) | 1.5 |
| [6.51, 10.00) | 1.1 |
FIG. 12
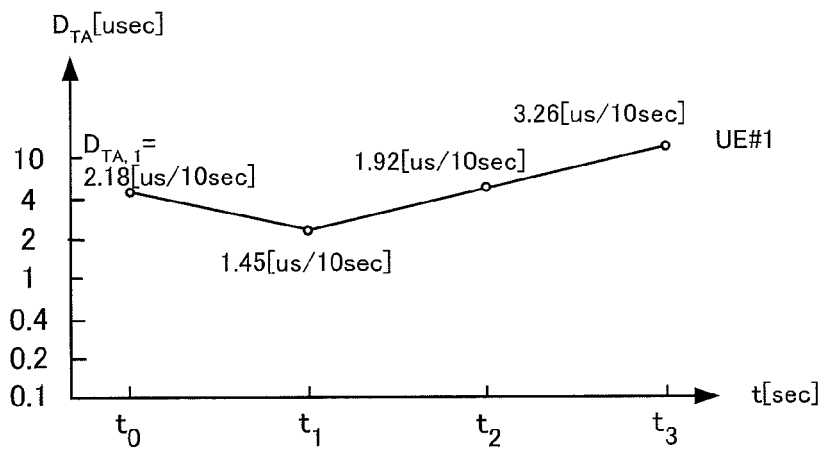

WIRELESS COMMUNICATION SYSTEM, ITS BASE STATION AND MOBILE STATION, COMMUNICATION SYNCHRONIZATION MANAGEMENT METHOD AND TIMER CONTROL PROGRAM THEREFOR

TECHNICAL FIELD

The present invention relates to a wireless communication system which manages synchronization by use of a timer, and more particularly, to a wireless communication system, its base station and mobile station, a communication synchronization management method and a timer control program therefore which enable the base station to adaptively control a transmit timing of an uplink signal from the mobile station.

BACKGROUND ART

In 3GPP Long Term Evolution (LTE), consideration is given to maintaining orthogonality between mobile stations (UE: user equipment) by allocating an orthogonal radio resource to each mobile station (UE) when transmitting and receiving data (a radio resource is an area uniquely defined by time and frequency; radio resources are set by dividing time and frequency into discrete areas for allocation to different mobile stations, so that one resource will not overlap between two mobile stations).

During transmission/reception of an uplink signal, in order to eliminate interference between mobile stations (UE) within the cell of a base station (Node B) so that the uplink signals can be demodulated correctly by the base station (Node B), it is essential that the base station's receive timing of an uplink signals from each of a plurality of mobile stations (UE) fall within a guard interval called a "cyclic prefix (CP)." At the same time, regardless of whether synchronization in data transmission/reception is actually being maintained, synchronization is assumed to be guaranteed if a receive timing falls within a predetermined timer period (i.e. during a timer is running). Based on this assumption, a state in which a receive timing falls within the timer period is judged to be a deemed in-sync state (i.e. a mobile station is assumed to be uplink synchronized), and a state in which a receive timing does not fall within the timer period (i.e. a timer expires) is judged to be a deemed out-of-sync state (i.e. a mobile station is assumed to be NOT uplink synchronized).

A mobile station (UE) which has been determined to be in a deemed out-of-sync state sends a Non-sync RACH (Non-synchronized Random Access Channel), in which a plurality of mobile stations (UE) compete for and use common radio resources, before transmitting an uplink signal. The mobile station then receives from the base station a timing advance (TA) for adjusting its transmit timing. According to the TA, the mobile station adjusts its transmit timing and finally synchronizes the uplink signal (i.e. the uplink signal is received within a CP at the base station).

Since each mobile station (UE) must secure synchronization while it is transmitting an uplink signal, a timing advance (TA) is notified from the base station to each mobile station, either at constant intervals or triggered by the occurrence of a specific event (e.g., a rapid change in the traveling speed of the mobile station). The reference time period from when the timing advance (TA) is last updated until the mobile station is judged to have returned to an out-of-sync state is either notified from the base station in the system information as the cell specific value or is pre-defined as a fixed value. The reference time is monitored at the base station and each of the mobile stations (UE) through use of a timer. Upon a timeout of the timer (i.e., when the reference time period described above expires), the mobile station (UE) is judged to have transited from a deemed in-sync state to a deemed out-of-sync state.

For the purpose of judging whether a mobile station (UE) is in a deemed in-sync state or a deemed out-of-sync state, the base station controls as many timers as the number of mobile stations (UE) under its management. The mth timer held by the base station (where m is an integer between 1 and M, and M is a natural number indicating the number of mobile stations (UE) managed by the base station) corresponds to the timer held by the mth mobile station (UE).

The plurality of timers controlled by the base station are set to the same length of time, so are the timers held by the plurality of mobile stations. The base station timers and the mobile station timers are set to a timer length such that synchronization can be guaranteed by the mobile station (UE) that is traveling at the highest speed (e.g., 350 km/h) of all the mobile stations (UE) supported by the base station. The timer length is therefore shorter than the minimum length of time over which this mobile station (UE) will become out-of-sync. A determination between a deemed in-sync state and a deemed out-of-sync state is made solely relying on the state of the timer, regardless of the actual traveling speed of the mobile station (UE). Non-patent Literature 1 discloses an example of a process for adjusting a transmit timing during transfer of an uplink signal in the 3GPP Long Term Evolution (LTE) described above.

When data is generated for transmission to the base station, a mobile station (UE) in a deemed in-sync state first transmits a Scheduling Request (SR) to the base station to request a radio resource over which to transmit the data, using a radio resource specific to the mobile station (UE). One method that can be used to assign a radio resource specific to a mobile station (UE) is to periodically assign a radio resource over which to transmit an SR to each of the mobile stations (UE) that are in a deemed in-sync state. On the other hand, when a mobile station (UE) in a deemed out-of-sync state transmits an SR, it first transmits a Non-sync RACH and receives a timing advance (TA) for controlling the transmit timing and, at the same time, assigns a radio resource specific to the mobile station (UE) over which to transmit the SR.

It is clear from the foregoing that a mobile station (UE) in a deemed out-of-sync state suffers a longer latency (or a delay due to waiting time) before it can initiate data transmission than a mobile station in a deemed in-sync state. This is because the former mobile station additionally requires a step of transmitting a Non-sync RACH before being able to perform a step of transmitting an SR. In addition, since orthogonality between mobile stations (UE) is not guaranteed for a Non-sync RACH, a collision may occur between mobile stations (UE). If a collision occurs, the transmitted Non-sync RACH may not be detected by the base station, in which case the mobile station (UE) must retransmit a Non-sync RACH. This further increases the latency.

Non-patent Literature 1 3GPP RAN WG2 Contribution [R2-063401.doc NTT DoCoMo]
http://www.3gpp.org/ftp/tsg_ran/WG2_RL2/TSGR2__56/ Document s/
Non-patent Literature 2 3GPP RAN WG1 Contribution [R1-063377.doc Nokia]
http://www.3gpp.org/ftp/tsg_ran/WG1_RL1/TSGR1__47/ Docs/
Non-patent Literature 3 3GPP RAN WG1 Contribution [R1-063405.doc Siemens]
http://www.3gpp.org/ftp/tsg_ran/WG1_RL1/TSGR1__47/ Docs/

In the related art described above, the timer length is set based on the time in which synchronization is guaranteed by a rapidly traveling (for example, at a speed of 350 km/h) mobile station (UE). This leads to a problem in which a mobile station (UE) that is standing still or traveling at a low speed may be judged to be in a deemed out-of-sync state upon a timeout of the timer, even though the actual uplink synchronization is being maintained.

Furthermore, if another data occurs at the mobile station (UE) and an uplink signal must be transmitted during a period in which the timer has timed out but synchronization is actually being maintained, the latency before the data can be transmitted becomes even longer.

This is because a static or slow-moving mobile station (UE) is judged to be out-of-sync based on the timer, even though it is actually in sync and can transmit a Scheduling Request (SR) using a radio resource specifically assigned to it. In such situation, the mobile station needs first to transmit a Non-sync RACH to receive a timing advance (TA) from the base station (Node B), so that it can be assigned a radio resource over which to transmit the SR according to the timing advance (TA).

OBJECTS OF INVENTION

An object of the present invention is to provide a wireless communication system, its base station and mobile station, a communication synchronization management method and a timer control program therefor which can control the timer length used for judging whether a mobile station is in a deemed in-sync state or in a deemed out-of-sync state adaptively for each a mobile station, thereby minimizing possibilities for an actually in-sync mobile station to be judged to be in a deemed out-of-sync state.

Another object of the present invention is to provide a wireless communication system, its base station and mobile station, a communication synchronization management method and a timer control program therefor which can reduce a latency in transmission of an uplink signal during a period in which a mobile station in a deemed out-of-sync state is actually in sync.

SUMMARY

According to a first exemplary aspect of the invention, a base station of a wireless communication system which performs wireless communication between a mobile station and a base station, comprises a timer unit which sets a period, during which synchronization of a receive timing at the base station for an uplink signal from the mobile station is guaranteed, and, according to the occurrence or non-occurrence of a timeout of the period, judges whether the mobile station is in a deemed in-sync state, in which uplink synchronization is guaranteed, or in a deemed out-of-sync state, in which uplink synchronization is not guaranteed, and a timer control unit which is made capable of determining the period of the timer unit for each mobile station according to the state of the mobile station and updating the timer unit.

According to a second exemplary aspect of the invention, a mobile station of a wireless communication system which performs wireless communication between a mobile station and a base station, comprises a timer unit which sets a period, during which synchronization of a receive timing at the base station for an uplink signal from the mobile station is guaranteed, and, according to the occurrence or non-occurrence of a timeout of the period, judges whether the mobile station is in a deemed in-sync state, in which uplink synchronization is guaranteed, or in a deemed out-of-sync state, in which uplink synchronization is not guaranteed, and a timer control unit which is made capable of determining the timer length according to the state of the mobile station and updating the timer unit.

According to a third exemplary aspect of the invention, a wireless communication system which performs wireless communication between a mobile station and a base station, comprises the base station and the mobile station comprising a timer unit which sets a period, during which synchronization of receive timings at the base station for uplink signals from the mobile station is guaranteed and, according to the occurrence or non-occurrence of a timeout of the period, judges whether the mobile station is in a deemed in-sync state, in which uplink synchronization is guaranteed, or in a deemed out-of-sync state, in which uplink synchronization is not guaranteed, and at least either of the base station and the mobile station comprising a timer control unit which is made capable of determining the timer length of at least either of the base station and the mobile station adaptively for each mobile station according to the state of the mobile station and updating the timer unit.

According to a fourth exemplary aspect of the invention, a communication synchronization management method in wireless communication system to perform wireless communication between a mobile station and a base station, comprises at the base station and the mobile station having a timer step of setting a period, during which synchronization of a receive timing at the base station for an uplink signal from the mobile station is guaranteed, and, according to the occurrence or non-occurrence of a timeout of the period, judging by a timer whether the mobile station is in a deemed in-sync state, in which uplink synchronization is guaranteed, or in a deemed out-of-sync state, in which uplink synchronization is not guaranteed, and at least one of the base station and the mobile station determining the period used in the timer step at least either of the base station and the mobile station adaptively for each mobile station according to the state of the mobile station and updating the timer.

According to a fifth exemplary aspect of the invention, a timer control program which is realized by a computer of a wireless communication system which performs wireless communication between a mobile station and a base station for operating on the base station, causing the computer to execute a function to set a period, during which synchronization of a receive timing at the base station for an uplink signal from the mobile station is guaranteed, and, according to the occurrence or non-occurrence of a timeout of the period, judge by a timer whether the mobile station is in a deemed in-sync state, in which uplink synchronization is guaranteed, or in a deemed out-of-sync state, in which uplink synchronization is not guaranteed, and a timer control function which is made capable of determining the timer length_for each mobile station according to the state of the mobile station and updating the timer.

According to a sixth exemplary aspect of the invention, a timer control program which is realized by a computer of a wireless communication system which performs wireless communication between a mobile station and a base station for operating on the mobile station, causing the computer to execute a function to set a period, during which synchronization of a receive timing at the base station for an uplink signal from the mobile station is guaranteed, and, according to the occurrence or non-occurrence of a timeout of the period, judge by a timer whether the mobile station is in a deemed in-sync state, in which uplink synchronization is guaranteed, or in a deemed out-of-sync state, in which uplink synchronization is not guaranteed, and a timer control function which is made capable of determining the timer length according to the state of the mobile station and updating the timer.

Effect of the present invention is that the probability can be reduced that a latency before data transmission increases when a mobile station that is actually in sync is judged to be out of sync based on a timeout of the timer used for judging whether a mobile station is in a deemed in-sync state or in a deemed out-of-sync state. This is because the present invention can control the timer length of each mobile station adaptively to the traveling speed of the mobile station.

BRIEF DESCRIPTION OF THE DRAWINGS

FIG. 5 is a block diagram for explaining correlations between timing advance values for receive timing and transmit timing;

FIG. 6 is a diagram for explaining the table which defines correlations between traveling speed and timer length, based on which a timer length is determined, according to the first exemplary embodiment of the present invention;

FIG. 7 is a diagram for explaining the method to determine a timer length according to the first exemplary embodiment of the present invention;

FIG. 10 is a block diagram for explaining the timer adaptive control part according to the first exemplary embodiment of the present invention;

FIG. 11 is a diagram for explaining the table which defines correlations between timing advance and timer length, based on which a timer length is determined, according to the first exemplary embodiment of the present invention;

FIG. 12 is a diagram for explaining the method to determine a timer length according to the first exemplary embodiment of the present invention;

EXEMPLARY EMBODIMENT

Figure 1:
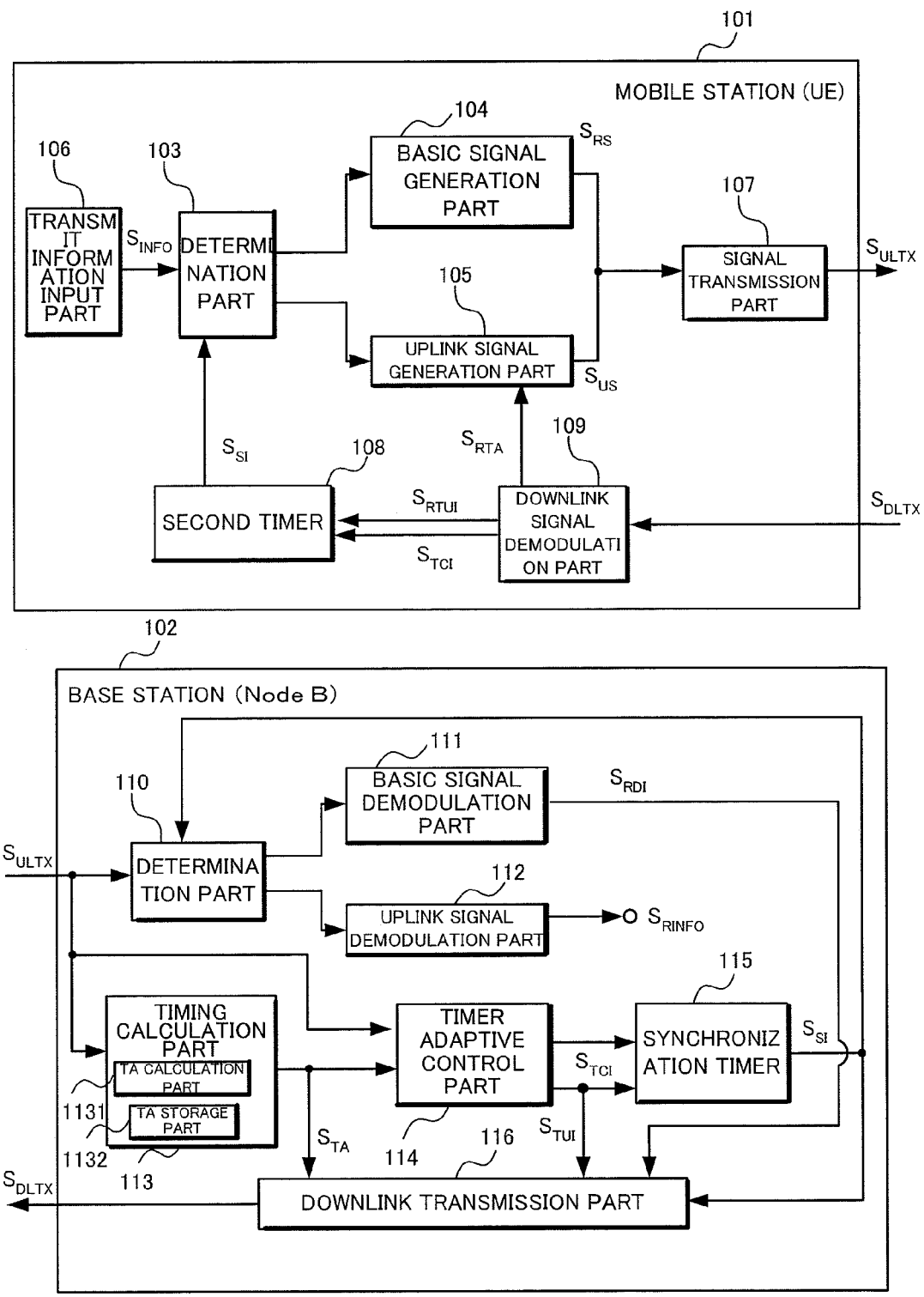
FIG. 1 is a block diagram for explaining a first exemplary embodiment of the present invention.

The present invention will now be described in detail with reference to the drawings.

First, in exemplary embodiments of the present invention, an initial value $T_{TM0}$ for the timer, which is used for judging whether a mobile station is in a deemed in-sync state or in a deemed out-of-sync state, is set during a period in which synchronization of a rapidly moving station can be guaranteed. This can be done by using a method similar to commonly used methods. In 3GPP LTE, a traveling speed of 350 [km/h] is assumed as a reference speed for setting a timer length.

In Non-patent Literature 2, the tolerance for deviations in transmit timing required for an uplink signal to be detected correctly is estimated to be approximately 1 [usec]. In Non-patent Literature 3, the worst case for synchronization loss is assumed to be when synchronization is lost as a result of a deviation of 1 [usec] in transmit timing.

Using these values as reference, each exemplary embodiment uses approx. 1.5 [sec] as the initial value $T_{TM0}$ for the timer. This is the length of time which causes transmit timing to deviate by 1 [usec] at a traveling speed of 350 [km/h]. The timer length set on the mth first timer (first timer #m) held by the base station (Node B) and the timer length set on the second timer held by the mth mobile station (UE #m) are the same, where m is an integer between 1 and M, and M is a natural number representing the number of mobile stations under management of the mobile station. A random access signal transmitted by a mobile station in an out-of-sync state consists of a sequence randomly selected from a predetermined number of sequences (for example, the Zadoff-Chu sequence).

"Synchronization" as used herein refers to a state in which a transmit timing is controlled by the base station so that a receive timing at which an uplink signal is transmitted from the mobile station to the base station falls within the required accuracy. The receive timing varies depending on such factors as the distance between the mobile station and the base station, i.e., the position of the mobile station. Therefore, a higher traveling speed of the mobile station results in a greater variation in the receive timing and consequently in a shorter length of time during which "synchronization" is maintained.

A distinction between a "deemed in-sync state" and a "deemed out-of-sync state" is judged based on whether the timer is running or expired. A "deemed in-sync state" is a state in which the timer is running and, based on this fact, it is judged that uplink synchronization between the mobile station and the base station can be guaranteed. A "deemed out-of-state" is a state in which the timer has expired and, based on this fact, it is judged that uplink synchronization between the mobile station and the base station cannot be guaranteed. This means that, even when a mobile station is judged to be in a "deemed out-of-sync state," it may actually be in sync. To the contrary, even when a mobile station is judged to be in a "deemed in-sync state," it may actually be out of sync.

Although the exemplary embodiments below are described with respect to 3GPP LTE as an example, the target of the present invention is not limited to LTE but can be wireless LAN, WiMAX or other similar technology. The present invention can be applied to any system which requires TDM-based synchronous connection and on which a deviation between transmit and receive timings can occur.

First Exemplary Embodiment

FIG. 1 is a block diagram showing the system structure of a wireless communication system according to the first exemplary embodiment of the present invention. In this exemplary embodiment, the calculation of an indicator value for determining a timer length, as well as the determination of the length of the first timer held by the base station and the second timer held by the mobile station (UE), are performed by the base station.

With reference to FIG. 1, the mobile station (UE) 101 comprises a determination part 103, a basic signal generation part 104, an uplink signal generation part 105, a transmit information input part 106, a signal transmission part 107, a second timer 108 and a downlink signal demodulation part 109.

At the mobile station (UE #m) 101, the downlink signal demodulation part 109 receives from the base station (Node B) 102 a downlink receive signal $S_{DLTX}$ which contains a timing advance (TA) for a uplink transmit timing, and outputs the reproduced timing advance (TA) $S_{RTA}$, which corresponds to the received timing advance (TA) at the mobile station; timer control information $S_{TCI}$, which notifies a reset of the second timer when a timing advance (TA) is notified from the base station (Node B); and reproduced timer update information $S_{RTUI}$, which corresponds to the timer update information indicating a new timer length in case the second timer is updated.

The second timer 108 operates according to the timer control information $S_{TCI}$ and the reproduced timer update information $S_{RTUI}$. When the reproduced timer update information $DS_{RTUI}$ is inputted, the second timer 108 updates the length of the second timer, and outputs as state information $S_{SI}$ the information as to whether the mobile station (UE) #m is in a deemed in-sync state or in a deemed out-of-sync state. The second timer 108 may perform the process to output state information $S_{SI}$ in such a manner that, for example, it outputs state information $S_{SI}$ only when the mobile station is in a deemed out-of-sync state and does not output state information $S_{SI}$ when the mobile station is in a deemed in-sync state.

When transmit information $S_{INFO}$ to be transmitted to the base station (Node B) 102 is inputted, the determination part 103 switches connection according to the state information $S_{SI}$. More specifically, it switches connection to the uplink signal generation part 105 if the information indicates a deemed in-sync state or to the basic signal generation part 104 if the information indicates a deemed out-of-sync state.

The basic signal generation part 104 has a function to generate and output a basic signal for use in communication with the base station (Node B) 102. In the example used in this and the other exemplary embodiments described below, a random access signal $S_{RS}$ is generated and outputted in order to receive a timing advance (TA) from the base station (Node B) for synchronizing an uplink signal.

The uplink signal generation part 105 adjusts the transmit timing according to the reproduced timing advance (TA) $S_{RTA}$, and generates and outputs an uplink signal $S_{US}$ that contains the transmit information $S_{INFO}$.

As an uplink transmit signal $S_{ULTX}$, the signal transmission part 107 transmits the uplink signal $S_{US}$ if the mobile station is in a deemed in-sync state or the random access signal $S_{RS}$ if the mobile station is in a deemed out-of-sync state.

Referring to FIG. 1, the base station (Node B) 102 comprises a determination part 110, a basic signal demodulation part 111, an uplink signal demodulation part 112, a timing calculation part 113, a timer adaptive control part 114, a synchronization timer 115, where a synchronization timer may be called as Time Alignment Timer instead, and a downlink transmission part 116.

At the base station (Node B) 102, the determination part 110 switches connection according to the state information $S_{SI}$ which indicates the state of the mobile station (UE) #m. More specifically, it switches connection to the uplink signal demodulation part 112 if the information indicates a deemed in-sync state or to the basic signal demodulation part 111 if the information indicates a deemed out-of-sync state.

The basic signal demodulation part 111 receives an input of an uplink received signal $S_{ULTX}$, which corresponds to a basic signal, and has a function to demodulate and output the inputted uplink received signal $S_{ULTX}$. In the example used in this and the other exemplary embodiments described below, the basic signal demodulation part 111 receives as input an uplink received signal $S_{ULTX}$ which corresponds to a random access signal $S_{RS}$, and outputs as random access detection information $S_{RDI}$ the information which indicates a sequence exceeding the pre-defined detection threshold.

The uplink signal demodulation part 112 demodulates an uplink received signal $S_{ULTX}$, which corresponds to an uplink signal $S_{US}$, and outputs reproduced transmit information $S_{RINFO}$, which corresponds to transmit information $S_{INFO}$.

The timing calculation part 113 has a TA calculation part 1131 and a TA storage part 1132. The timing calculation part 113 uses the TA calculation part 1131 to detect the receive timing (i.e., a deviation in the receive timing) for an uplink received signal $S_{ULTX}$, and calculates a timing advance (TA) $S_{TA}$ to notify to the mobile station (UE) #m based on the detected receive timing. It then stores the resultant TA in the TA storage part 1132 and outputs this TA $S_{TA}$.

The timer adaptive control part 114, using as input both or either of an uplink received signal $S_{ULTX}$ and/or a timing advance (TA) $S_{TA}$, determines the length of the first timer #m and the second timer of the mobile station (UE) #m. It then outputs the resultant timer length as timer update information $S_{TUI}$, as well as the information which notifies a reset of the first timer #m by sending a timing advance (TA) to the mobile station (UE) #m as timer control information $S_{TCI}$.

The synchronization timer 115, which has M first timers, operates according to the timer update information $S_{TUI}$ and the timer control information $S_{TCI}$, and outputs as state information $S_{SI}$ the information as to whether the mobile station (UE) #m is in a deemed in-sync state or in a deemed out-of-sync state.

The downlink transmission part 116, according to the state information $S_{SI}$, generates and transmits a downlink transmit signal $S_{DLTX}$. The downlink transmit signal $S_{DLTX}$ contains a timing advance (TA) $S_{TA}$ and timer update information $S_{TUI}$ in the case of a deemed in-sync state or contains a timing advance (TA) $S_{TA}$, a timer update information $S_{TUI}$ and random access detection information $S_{RDI}$ in the case of a deemed out-of-sync state.

Figure 2:
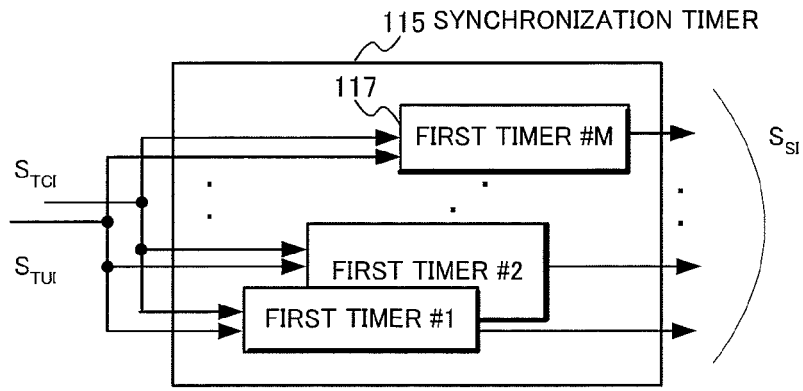
FIG. 2 is a block diagram for explaining the synchronization timer according to the first exemplary embodiment of the present invention.

The synchronization timer consists of M first timers 117, as shown in FIG. 2. The first timer #m corresponds to the second timer of the mobile station (UE) #m.

When determining the length of the first timer #m and the second timer of the mobile station (UE) #m, the timer adaptive control part 114 uses as an indicator both or either of a traveling speed $S_{VT}$, which is the result obtained by estimating the traveling speed of the mobile station (UE) #m, and/or transmit timing variation information $S_{TADI}$, which is the result obtained by calculating a time variation for the timing advance (TA).

Figure 3:
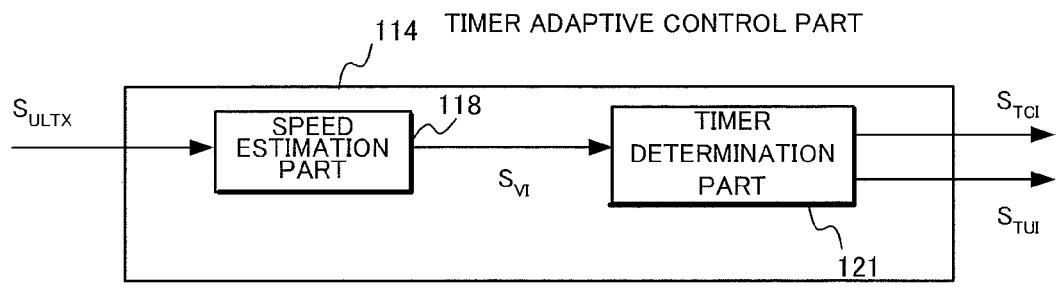
FIG. 3 is a block diagram for explaining the timer adaptive control part according to the first exemplary embodiment of the present invention.
Figure 14:
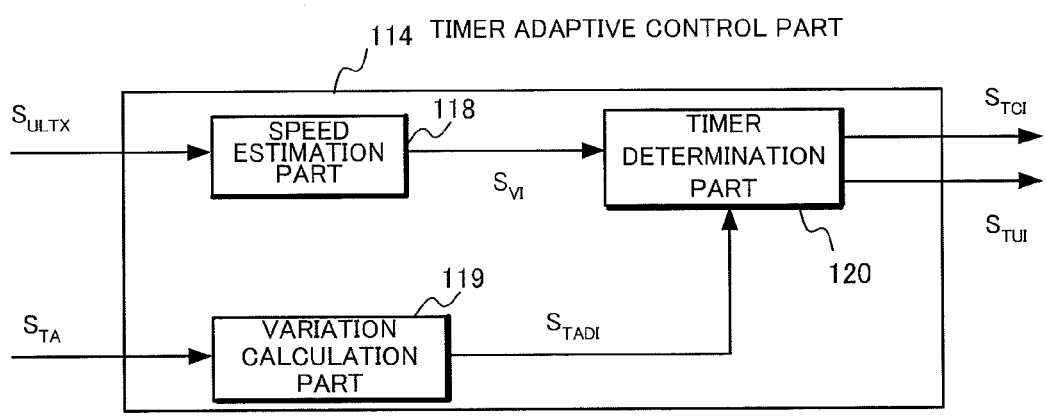
FIG. 14 is a block diagram for explaining the timer adaptive control part according to the first exemplary embodiment of the present invention.

FIGS. 3, 10 and 14 show the structure of the timer adaptive control part when using as an indicator a traveling speed; a time variation in timing advance (TA); or a traveling speed and a time variation in a timing advance (TA), respectively.

The timer adaptive control part 114 of FIG. 3 comprises a speed estimation part 118, which estimates the traveling speed $S_{VT}$ of the mobile station (UE) #m by using as input an uplink received signal $S_{ULTX}$, and a timer determination part 121, which determines by using the traveling speed $S_{VT}$ as input the length of the first timer #m and the length of the second timer of the mobile station (UE) #m.

One estimation method for a traveling speed that can be used here is to estimate it from a Doppler frequency $F_d$ [Hz] (where $F_d$ is a real number equal to or greater than 0).

Figure 4:
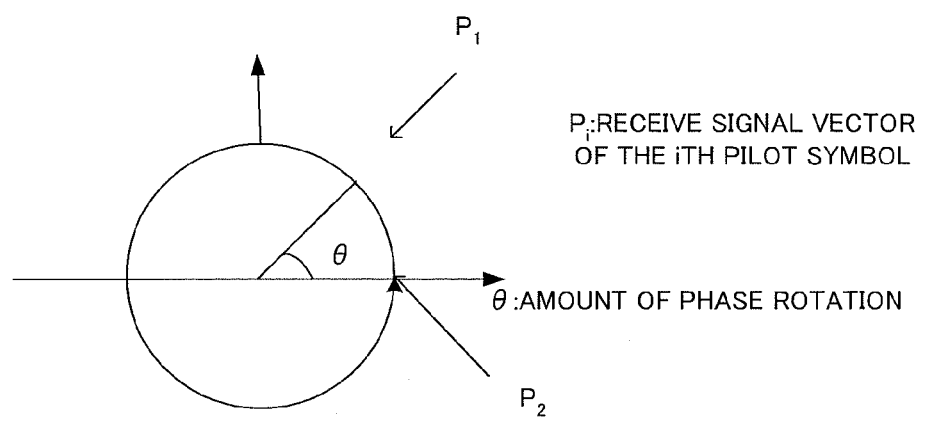
FIG. 4 is a block diagram for explaining the method to estimate the traveling speed of a mobile station.

A Doppler frequency $F_d$ can be estimated by using the phase rotating amount θ [rad] (where θ is a real number equal to or greater than 0) of a known pilot symbol. For example, as shown in FIG. 4, when it is assumed that $P_1$ and $P_2$ are received signal vectors corresponding to the first and second pilot symbols, respectively, and that $T_P$ is a time-domain interval between $P_1$ and $P_2$, a phase rotating amount θ can be obtained from a relational expression: $\theta = \{\cos^{-1}(P_1 \Gamma P_2)\}/T_P$ (where Γ is an inner product). Using the value of θ thus obtained, a Doppler frequency $F_d$ can be obtained from a relational expression: $F_d = \theta/\{2\pi T_P\}$. Furthermore, using the Doppler frequency $F_d$ thus obtained, a traveling speed v can be calculated from a relational expression: $v = F_d \lambda = F_d(c/f)$, where λ is a wavelength [m], c is the light speed $3 \times 10^8$ [m/s] and f is a carrier frequency [Hz].

FIG. 5 shows an example correlation between a receive timing detected by the base station (Node B) and a timing advance (TA) for a transmit timing to be notified to the mobile station (UE).

In FIG. 5, a cyclic prefix (CP) is added to the head of an uplink signal (1 frame). The ideal receive timing is such that the head of the CP comes at the head of each time slot. A deviation x [us] of the receive timing actually detected from the ideal receive timing occurs due to such factors as the movement of the mobile station (UE) and deviation in a transmit timing.

The amount of deviation in a transmit timing may be notified to the mobile station (UE) using either of the following two methods: one method is to notify the absolute value of x [us] as a timing advance (TA); and another is to notify a value obtained by time-dividing x [us] as a timing advance (TA). In the method to notify a time division value, it is notified that one transmission of timing advance (TA) will be advanced or delayed by y [us] units of a pre-defined constant step. Thus, in the case of the method to notify a time division value, a transmit timing may be transmitted using 1 bit to notify, for example, that the fixed value will be advanced by y [us] if the transmitted value is 0 or the fixed value will be delayed by y [us] if the transmitted value is 1. In this case, if the actually calculated amount of deviation in a transmit timing is +4×y [us], a value of 0 is transmitted four times so that the transmit timing will be advanced by 4×y [us] in total.

There is another method that combines these two methods. A possible combination is to use the method to notify an absolute value when setting an initial value for a transmit timing and the method to notify a time-division value when updating the transmit timing.

Figure 8:
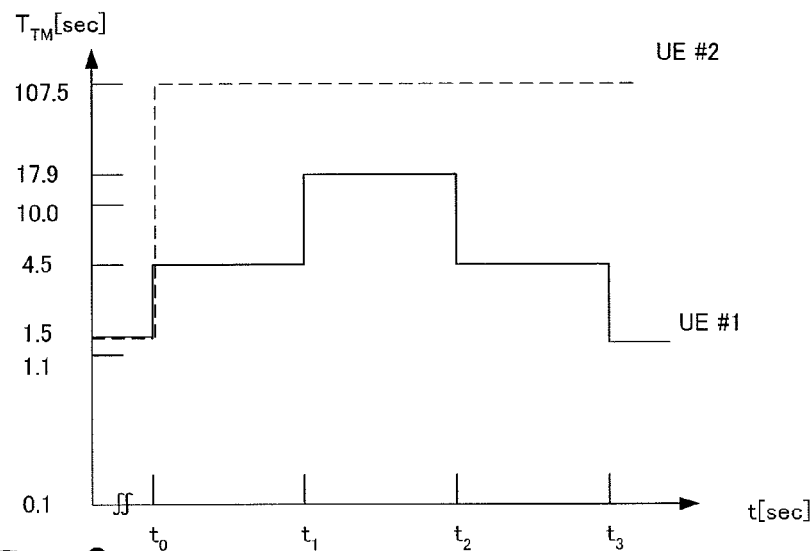
FIG. 8 is a diagram for explaining the method to determine a timer length according to the first exemplary embodiment of the present invention.

FIGS. 6 to 8 are diagrams for explaining the method to determine and update the length of the first and second timers according to the first exemplary embodiment.

The timer adaptive control part 114 is assumed to comprise a speed estimation part 118 and a timer determination part 121 (FIG. 3). The timer determination part 121 determines the length of the first and second timers, based on the traveling speed $S_{VT}$ and the table which pre-defines correlations between traveling speed and timer length. This exemplary embodiment uses the table shown in FIG. 6 which defines correlations between traveling speed and timer length.

Each of the timer lengths in the table of FIG. 6 has been calculated using the expression (1) below, and indicates the time [sec] of deviation caused at each traveling speed in the same transmit timing value as the transmit timing value assumed to deviate by 1.5 [sec] at a traveling speed of 350 [km/h], which is the reference speed used when setting the initial value.

(EXPRESSION 1)

$$D_{TA}[u\text{sec}] = v[\text{km/h}] \times \frac{1}{3600} \times t[\text{sec}] \times 6.7[u\text{sec/km}] \quad (1)$$

where $D_{TA}$ [usec] is the value of deviation in transmit timing; v [km/h] is the traveling speed of the mobile station (UE); t [sec] is the time which causes a deviation of $D_{TA}$; and 6.7 [usec/km] is a Round Trip Delay (RTD), which is a propagation delay caused between the base station (Node B) and the mobile station (UE).

The expression (1) is used to create a table as shown in FIG. 6. The table is created by first determining the increments of the threshold for traveling speed v and the acceptable amount of transmit timing deviation $D_{TA}$, and then substituting the resultant values to calculate t in the expression (1). The value of t thus obtained is used as a timer length.

In this exemplary embodiment, the speed estimation part 118 of the base station (Node B) estimates the traveling speeds of the two mobile stations (UE #1, UE #2) at regular time intervals as shown in FIG. 7. The timer determination part 121 determines the length of the first and second timers at each of the times ($t_0$, $t_1$, $t_2$, $t_3$). Based on the results, the first and second timers are controlled adaptively. It is assumed here that the initial value $T_{TM0}$ for all the pairs of the first and second timers is 1.5 [sec], which is the length of time determined to deal with a traveling speed of 350 [km/h].

In FIG. 7, the mobile station (UE) #1 will first be considered. The traveling speed at $t_0$ is 40 [km/h]. This is much lower than the traveling speed 350 [km/h] targeted by the initial value for all the first and second timer pairs, implying that synchronization will continue for a longer period. In this case, the length of the first timer #1 and the second timer of the mobile station (UE) #1 can be made longer.

Referring to the table of FIG. 6, the traveling speed of 40 [km/h] is between 30 [km/h] to 120 [km/h], so the length of the first timer #1 and the second timer of the mobile station (UE) #1 is determined to be 4.5 [sec].

The base station (Node B) notifies to the mobile station (UE) #1 the timer update information indicating that the timing advance (TA) and the length of the second timer will be updated to 4.5 [sec]. Immediately after issuing this notification, it updates the length of the first timer #1 to 4.5 [sec] and causes the first timer #1 to start operating again.

The mobile station (UE) #1 demodulates the downlink signal to reproduce the timing advance (TA) and the timer update information, updates the length of the second timer to 2.9 [sec] and causes the second timer to start operating again.

Similarly, the lengths of the first timer #1 and the second timer of the mobile station (UE) #1 at t=$t_1$, $t_2$, $t_3$ are determined to be 17.9 [sec], 4.5 [sec] and 1.5 [sec], respectively. Every time the timer length is updated, the base station (Node B) notifies to the mobile station (UE) #1 the new length of the second timer thus determined.

Next, the mobile station (UE) #2 will be considered. Its initial value is the same as the mobile station (UE) #1, i.e., 1.5 [sec]. The traveling speed at $t_0$ is 4 [km/h]. This speed is even lower than the mobile station (UE) #1. The timer length can be made longer because synchronization will continue for a longer period than the mobile station (UE) #1.

Referring to the table of FIG. 6, the traveling speed of 4 [km/h] is between 0 [km/h] to 5 [km/h], so the length of the first timer #2 and the second timer of the mobile station (UE) #2 is determined to be 107.5 [sec].

The base station (Node B) notifies to the mobile station (UE) #2 the timer update information indicating that the timing advance (TA) and the length of the second timer will be updated to 107.5 [sec]. Immediately after issuing this notification, it updates the length of the first timer #2 to 107.5 [sec] and causes the first timer #1 to start operating again.

The mobile station (UE) #2 demodulates the downlink signal to reproduce the timing advance (TA) and the timer update information, updates the length of the second timer to 107.5 [sec] and causes the second timer to start operating again.

Similarly, estimation of the traveling speeds at t=$t_1$, $t_2$, $t_3$ results in 3 [km/h], 2 [km/h] and 2 [km/h], which are almost the same as the result for $t_0$. Therefore, the timer setting over the observation period of FIG. 7 is determined to remain the same at 107.5 [sec] without the need of any update. The base station (Node B) and the mobile station (UE) #2 respectively repeat the process of resetting the length of the first timer #2 or the second timer and causing the respective timers to start operating again, every time the timing advance (TA) is calculated or notified.

FIG. 8 shows the results of determining the timer length as described above.

Figure 9:
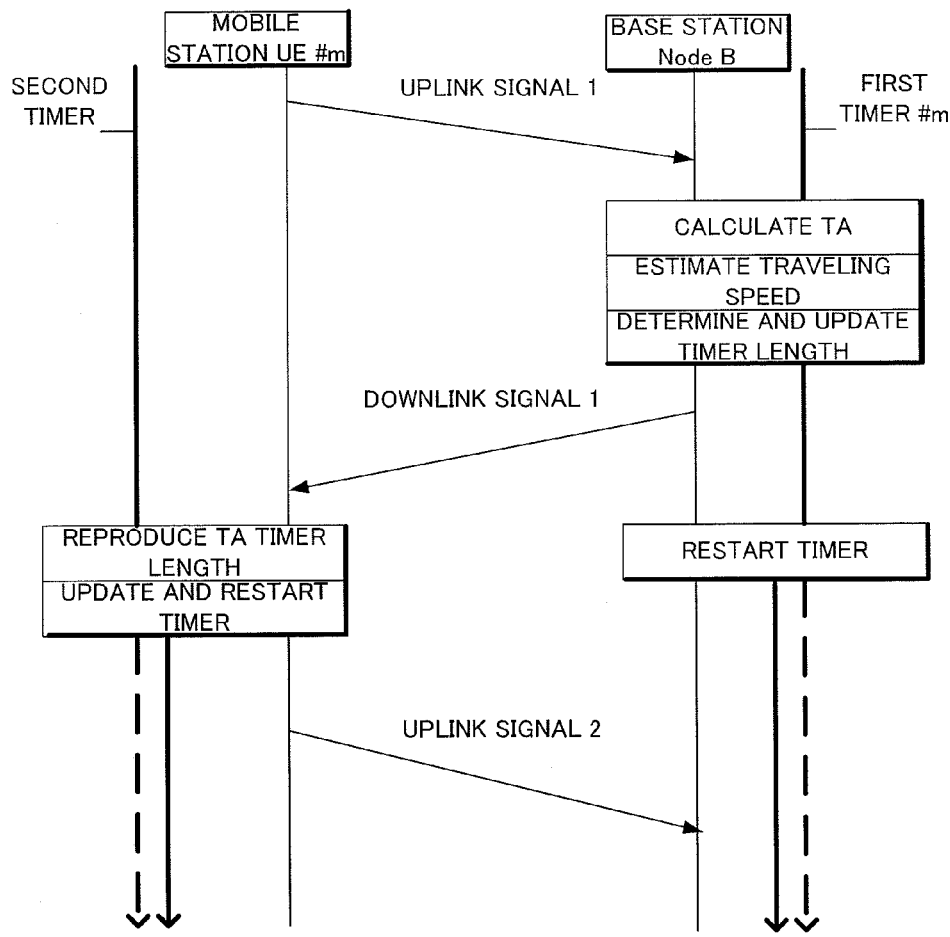
FIG. 9 is a diagram for explaining the procedure to determine a timer length according to the first exemplary embodiment of the present invention.

FIG. 9 is a diagram showing the part of the process performed by the base station (Node B) and the mobile station (UE) #m according to this exemplary embodiment which relates to the determination of the length of the first timer #m and the second timer of the mobile station (UE) #m.

After receiving an uplink signal 1 from the mobile station (UE) #m, the base station (Node B) calculates a timing advance (TA), estimates the traveling speed and determines the length of the first timer #m and the second timer of the mobile station (UE) #m. The base station (Node B) then notifies to the mobile station (UE) #m the timing advance (TA) and the updated length of the second timer via a downlink signal 1. Immediately after transmitting the downlink signal 1 to the mobile station (UE) #m, the base station (Node B) resets the first timer #m and causes the first timer #m to start operating again.

The mobile station (UE) #m demodulates the downlink signal 1 to reproduce the timing advance (TA) and the updated second timer length. After updating the second timer to the reproduced timer length, the mobile station (UE) #m resets the second timer and causes the second timer to start operating again. The mobile station (UE) #m then adjusts the transmit timing according to the reproduced timing advance (TA) and transmits an uplink signal 2.

A possible signal that can be used by the speed estimation part of the base station (Node B) for estimation of a traveling speed is a known signal (Reference Signal: RS) for demodulating the data from the mobile station (UE) transmitted via the Uplink Shared Channel (UL-SCH) and the uplink signal including the control information, or an RS for CQI measurement which is transmitted to allow the base station (Node B) to measure the quality of an uplink line (Channel Quality Indicator: CQI) transmitted via a UL-SCH. Also, a possible signal for notifying a timer update is a signal for controlling Layer 1/Layer 2 (L1/L2 control signalng) transmitted via a Downlink Shared Channel (DL-SCH), or a signal for data transmission (Physical Downlink Shared Channel: PDSCH) transmitted via a DL-SCH.

The timer adaptive control part 114 of FIG. 10 comprises a variation calculation part 119, which calculates and outputs the time variation $S_{TADI}$ in the timing advance (TA) by using a timing advance (TA) $S_{TA}$ as input, and a timer determination part 122, which determines by using the time variation $S_{TADI}$ in the timing advance (TA) as input the length of the first timer #m and the length of the second timer of the mobile station (UE) #m.

In the method according to the present invention which uses a time variation in a timing advance (TA) as an indicator for determining a timer length, if an absolute value of the amount of deviation in a transmit timing is notified as a timing advance (TA), the amount of variation in a timing advance (TA) over an observation period is directly used as the time variation in the timing advance (TA). On the other hand, if a time-divided value of the amount of deviation in a transmit timing is notified as a timing advance (TA), the time-divided values of the timing advance (TA) are summed up to reproduce the actual amount of deviation in the transmit timing, and the amount of variation of the reproduced transmit timing over an observation period is used as a time variation in the timing advance (TA).

The timer determination part 122 determines the length of the first and second timers, based on the time variation in the timing advance (TA) and the table which pre-defines correlations between time variation in timing advance (TA) and timer length. In the description of this exemplary embodiment, the method to notify the amount of deviation in a timing advance (TA) as an absolute value will be considered.

Each of the timer lengths in the table of FIG. 11 has been calculated using the expressions (2) to (4) below, based on different correlations between an amount of deviation in transmit timing during an observation interval and a traveling speed at which such amount of deviation is expected to occur.

(EXPRESSION 2)

$$D_{TA}[u\text{sec}] = v[\text{km/h}] \times \frac{1}{3600} \times t[\text{sec}] \times 6.7[u\text{sec/km}] \quad (2)$$

(EXPRESSION 3)

$$v[\text{km/h}] = \frac{1}{6.7[u\text{sec/km}]} \times \frac{3600}{\Delta t[\text{sec}]} \times \Delta d[u\text{sec}] \quad (3)$$

(EXPRESSION 4)

$$D_{TA}[u\text{sec}] = t[\text{sec}] \times \frac{\Delta d[u\text{sec}]}{\Delta t[\text{sec}]} \quad (4)$$

where, in the expression (2), $D_{TA}$ [usec] is the value of deviation in the transmit timing; v [km/h] is the traveling speed of the mobile station (UE); t [sec] is the time which causes a deviation of $D_{TA}$; and 6.7 [usec/km] is a Round Trip Delay (RTD), which is a propagation delay caused between the base station (Node B) and the mobile station (UE). In the expression (3), Δd [usec] is the amount of deviation in the transmit timing caused over a period of Δt [sec].

Suppose that the variation calculation part of the base station (Node B) calculates a time variation in a timing advance (TA) at regular time intervals, i.e., per 10 [sec], for a mobile station (UE) #1 and that the results are as shown in FIG. 12. At each of the times ($t_0$, $t_1$, $t_2$, $t_3$), the timer determination part determines the length of the first and second timers and controls the first and second timers adaptively. It is assumed here that the initial value $T_{TM0}$ for the first and second timers is 1.5 [sec], which is the length of time determined to deal with a traveling speed of 350 [km/h].

The time variation in the timing advance (TA) at $t_0$ calculated by the variation calculation part of the base station (Node B) is 2.18 [usec/10 sec]. Referring to the table of FIG. 11, the variation is between 0.56 [usec/10 sec] to 2.23 [usec/10 sec], so the timer length can be made longer than the initial value 1.5 [sec]. Based on the table, the length of the first and second timer #1 is determined to be 4.5 [sec].

The base station (Node B) notifies to the mobile station (UE) #1 the timer update information indicating that the timing advance (TA) and the length of the second timer will be updated to 4.5 [sec]. Immediately after issuing this notification, it updates the length of the first timer #1 to 4.5 [sec] and causes the first timer #1 to start operating again.

The mobile station (UE) #1 demodulates the downlink signal to reproduce the timing advance (TA) and the timer update information, updates the length of the second timer to 2.9 [sec] and causes the second timer to start operating again.

Similarly, at t=$t_1$, $t_2$, $t_3$, the results obtained by the base station (Node B) from the calculation of the time variation in the timing advance (TA) are 1.45 [usec/10 sec], 1.92 [usec/10 sec] and 3.28 [usec/10 sec]. Referring to the table of FIG. 11, it can be determined that the lengths of the first and second timers are 4.5 [sec], 4.5 [sec] and 1.5 [sec], respectively.

Figure 13:
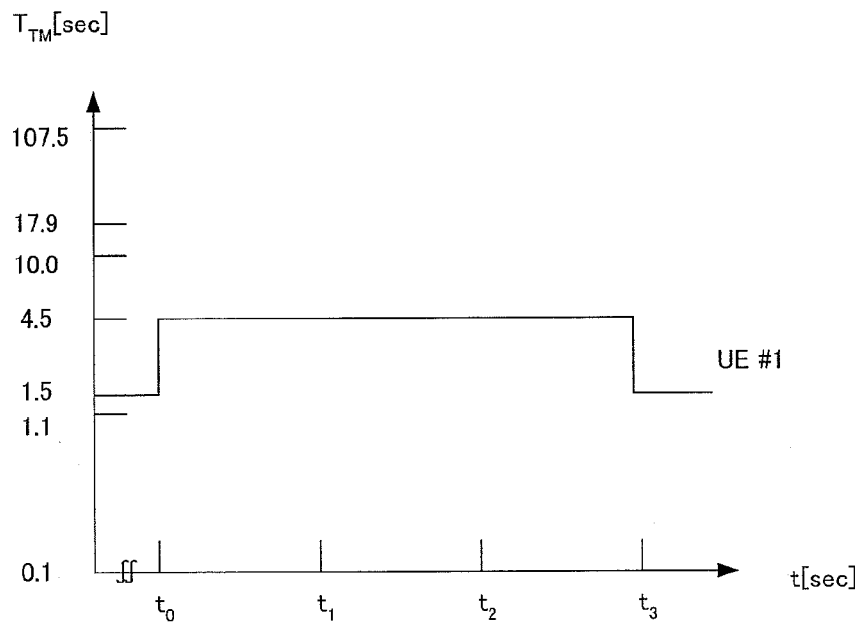
FIG. 13 is a diagram for explaining the method to determine a timer length according to the first exemplary embodiment of the present invention.

FIG. 13 shows the results of determining the timer length as described above.

The timer adaptive control part 114 of FIG. 14 comprises a speed estimation part 118, which estimates the traveling speed $S_{VI}$ of the mobile station (UE) #m by using as input an uplink received signal $S_{ULTX}$; a variation calculation part 119, which calculates and outputs the time variation $S_{TADI}$ in the timing advance (TA) by using as input a timing advance (TA) $S_{TA}$; and a timer determination part 120, which determines the length of the first timer #m and the length of the second timer of the mobile station (UE) #m by using as input the traveling speed $S_{VI}$ and the time variation $S_{TADI}$ in the timing advance (TA). The timer adaptive control part 114 determines the length of the first timer #m and the second timer of the mobile station (UE) #m, using the method explained with reference to FIGS. 3 and 10. In the case where both the traveling speed $S_{VI}$ and the time variation $S_{TADI}$ in a timing advance (TA) are used as an indicator, it is desirable to use the shorter of the two timer lengths obtained separately for the two indicators, but the longer one may be used as necessary.

Next, the operation of a base station (Node B) according to this exemplary embodiment will be described.

Figure 15:
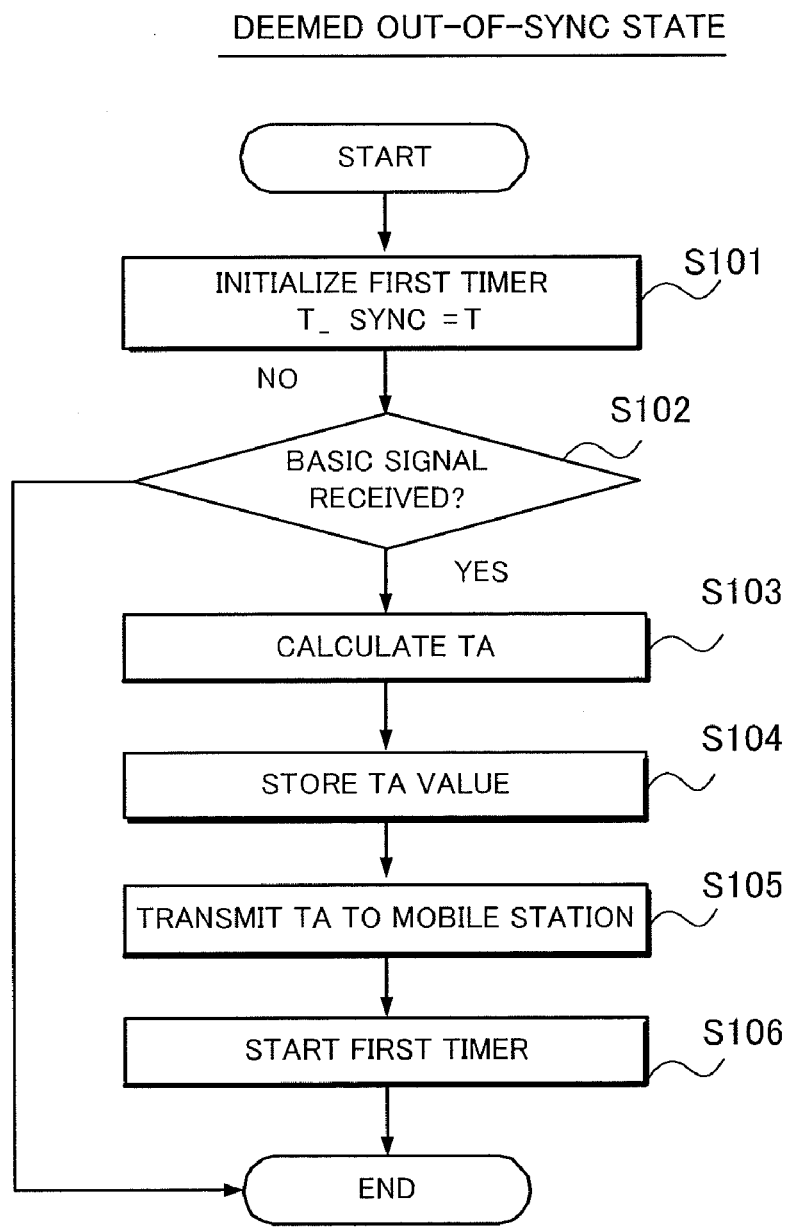
FIG. 15 is a flow chart showing the operation of the base station according to the first exemplary embodiment of the present invention.
Figure 16:
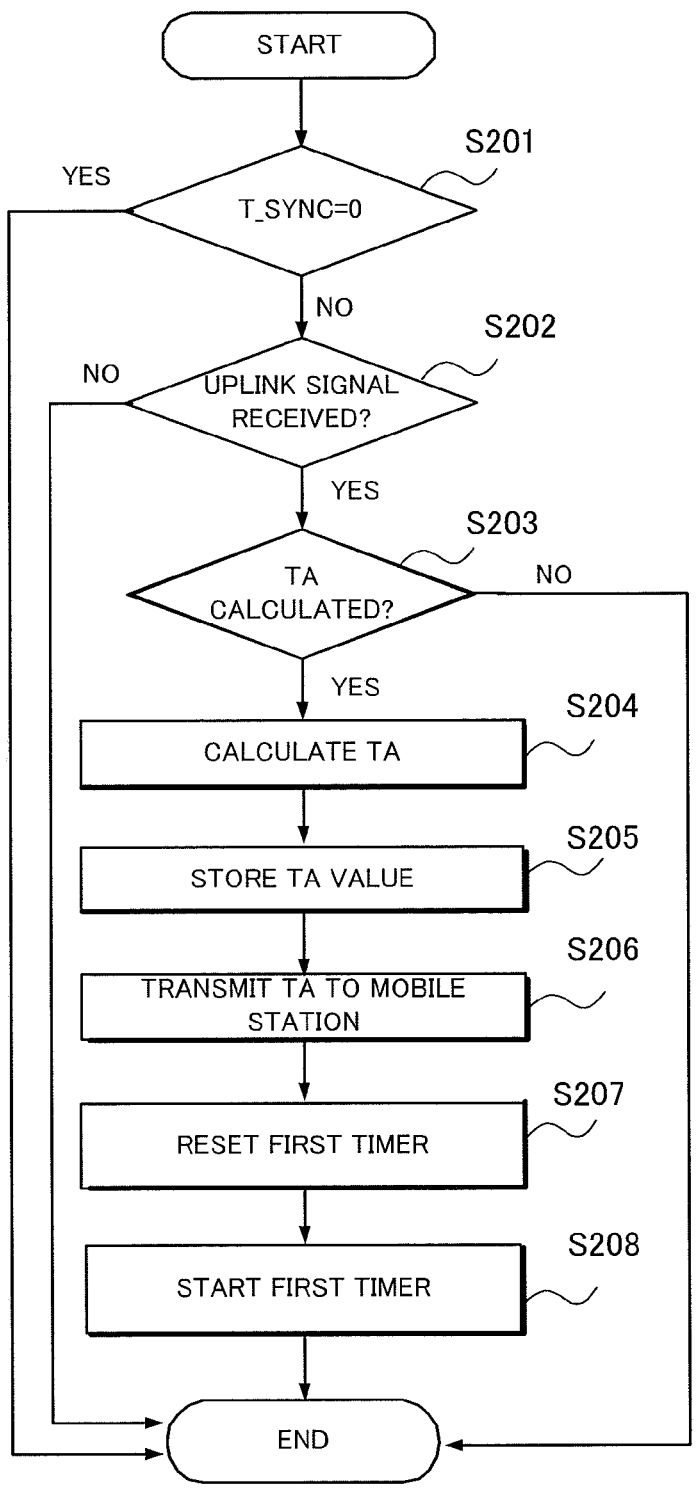
FIG. 16 is a flow chart showing the operation of the base station according to the first exemplary embodiment of the present invention.
Figure 17:
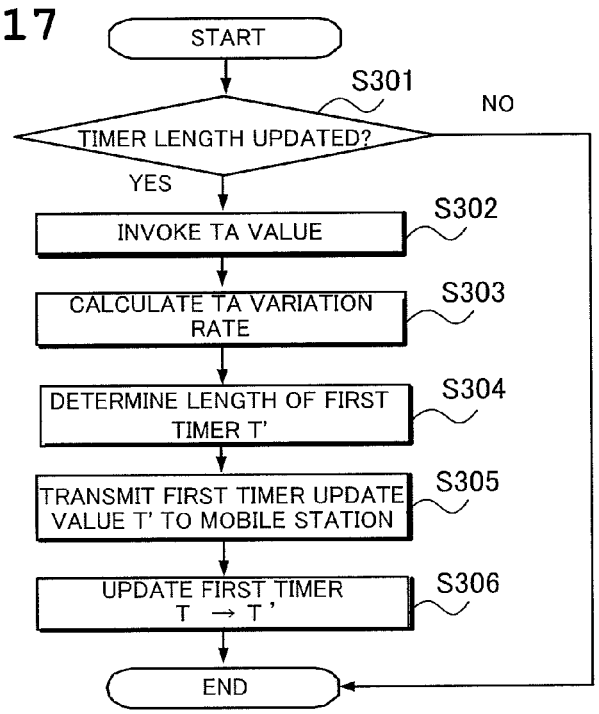
FIG. 17 is a flow chart showing the operation of the base station according to the first exemplary embodiment of the present invention.

FIGS. 15 to 17 are flow charts showing the operation of the base station according to the first exemplary embodiment of the present invention. FIG. 15 shows the operation in the case of a deemed out-of-sync state. FIG. 16 shows the operation in the case of a deemed in-sync state. FIG. 17 shows the operation to determine and update a timer length.

Referring to FIG. 15, which relates to the case of a deemed out-of-sync state, the base station (Node B) 102 initializes the first timer (T_SYNC-T) (step S101) and determines whether or not the basic signal (random access signal) has been received (step S102).

The following assumptions are used here.

Firstly, the base station (Node B) 102 assigns a radio resource for transmission of an uplink signal such that an uplink signal (other than a random access signal) from the mobile station (UE #m) 101 is always received before the timer times out. Therefore, a situation never occurs where an uplink signal is received after a timeout of the timer.

Secondly, the length (set value) of the first timer held by the base station (Node B) 102 is the same as the length of the second timer held by the mobile station (UE #m) 101.

Thirdly, the calculation of a timing advance (TA) is performed at regular time intervals. It should be noted that calculation at regular time intervals is employed by way of an example and that a timing advance (TA) may be calculated every time an uplink signal is received.

Fourthly, a timing advance (TA) is transmitted to the mobile station every time it is calculated. Since a determination based on a threshold is not necessary, it is guaranteed that the next timing advance (TA) is calculated before a timeout. However, if the base station (Node B) 102 has not received or transmitted any data for a certain fixed period and thus does not need to maintain synchronization any more, it returns the information concerning the mobile station to a deemed out-of-sync state upon a timeout, without instructing the mobile station to transmit an uplink signal for calculation of a timing advance (TA).

Although the present invention also allows the determination and update of a timer length to be performed at regular time intervals (or in response to a certain trigger event) (which similarly applies to the other exemplary embodiments described below), this exemplary embodiment is described only with respect to the selection part which selects between whether or not a timer length will be determined.

If it determines that a basic signal (random access signal) has been received, the base station (Node B) 102 calculates a timing advance (TA) (step S103) and stores the calculated timing advance (TA) (step S104); transmits the timing advance (TA) to the mobile station (UE #m) 101 (step S105); and causes the first timer to start operating (step S106). On the other hand, if it determines that a basic signal (random access signal) has not been received, the base station (Node B) 102 does not perform the processes of steps S103 to S106.

As shown in FIG. 16, in the case of a deemed in-sync state, the base station (Node B) 102 determines whether the value T_SYNC of the first timer is 0 or not (step S101). If the value is 0, the base station (Node B) 102 ends the process. Otherwise, it determines whether or not an uplink signal has been received (step S202).

If it determines that an uplink signal has been received, base station (Node B) 102 determines whether or not to calculate a timing advance (TA) (step S203). Otherwise, it ends the process.

If it determines that a timing advance (TA) should be calculated, the base station (Node B) 102 calculates a timing advance (TA) (step S204); stores the calculated timing advance (TA) in the TA storage part 1132 (step S205); transmits the timing advance (TA) to the mobile station (UE #m) 101 (step S206); resets the first timer (step S207); and starts the first timer (step S208). Otherwise, the base station (Node B) 102 does not perform the processes of steps S204 to S208.

As shown in FIG. 17, the base station (Node B) 102 determines whether or not to update the first timer (step S301). If it determines that the first timer does not have to be updated, it ends the process.

If it determines that the first timer should be updated, the base station (Node B) 102 invokes the timing advance (TA) (step S302); calculates the rate of variation in the timing advance (TA) (step S303); determines the first timer length T' after updating (step S304); transmits the updated value T' for the first timer to the mobile station (UE #m) 101 (step S305); and updates the length of the first timer to T' (step S306).

Possible locations to insert the operation to determine and update a timer length shown in FIG. 17 include immediately after the conditional branch at step S202 performed in the case of a deemed in-sync state in FIG. 16 or before the timer reset process at step S207. However, these locations are examples only and not limited to these.

It is also possible to change the intervals at which to update a transmit timing from the mobile station (UE #m), proportionally to the length of the first and second timers determined for each mobile station (UE #m).

An example hardware structure for the mobile station (UE #m) 101 and the base station (Node B) 102 will now be described.

Figure 18:
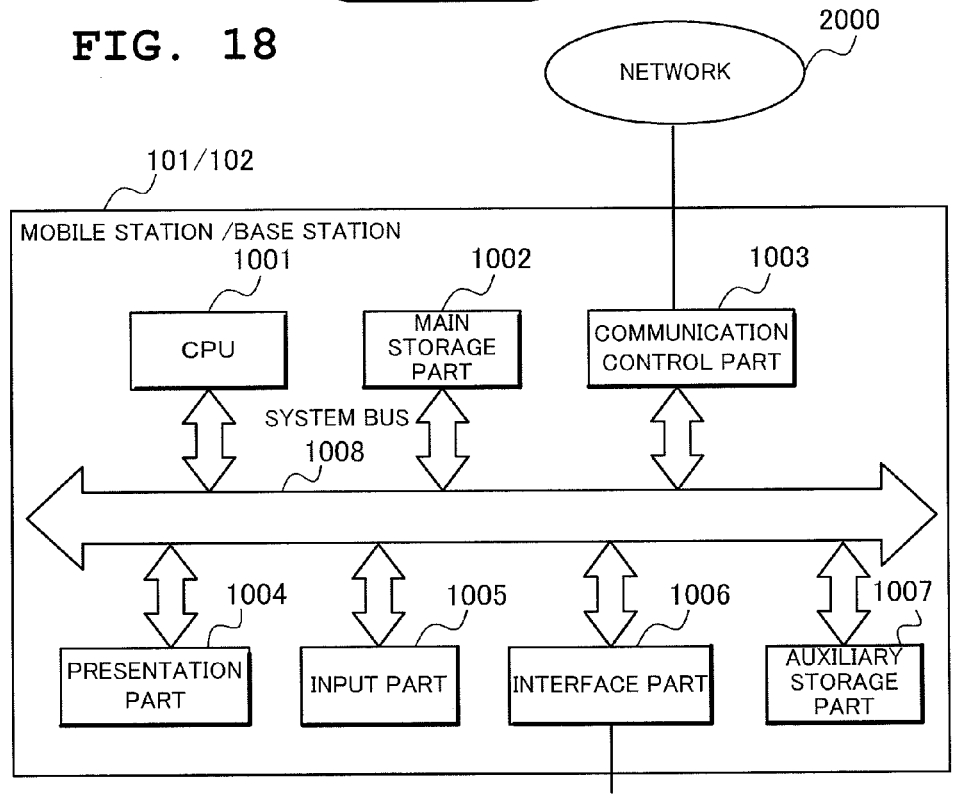
FIG. 18 is a block diagram showing a hardware structure of the mobile station and the base station according to the first exemplary embodiment of the present invention.

FIG. 18 is a block diagram showing the hardware structure of the mobile station 101 and the base station 102 according to this exemplary embodiment of the present invention.

As shown in FIG. 18, the mobile station 101 and the base station 102 according to the present invention may be realized in any hardware structure similar to general computer devices, and mainly comprises a CPU (Central Processing Unit) 1001; a main storage part 1002 which is a main memory, such as a RAM (Random Access Memory), used as data workspace and temporary save space for data; a communication part 1003, which transmits and receives data via the network 2000; a presentation part 1004, such as an LCD, printer and speakers; an input part 1005, such as a keyboard and mouse; an interface part 1006, which is connected with peripherals to perform transmission/reception of data; an auxiliary storage part 1007, which is a hard disc devise consisting of a nonvolatile memory, such as a ROM (Read Only Memory), magnetic disc and semiconductor memory; and a system bus 1008, which connects between the above-mentioned components of this information processing unit.

It goes without saying that the operations of the mobile station 101 and the base station 102 according to the present invention can be realized in hardware form by implementing within the mobile station 101 and the base station 102 a circuit component which consists of an LSI (Large Scale Integration) or other hardware parts into which a program that realizes these functions is incorporated, but these operations can also be realized in software form by causing the CPU 1001 on the computer processing unit to execute a program which provides the functions of these components.

In other words, the CPU 1001 can realize the above-described functions in a software-based manner by loading a program stored in the auxiliary storage part 1007 into the main storage part 1002 and executing the program to control the operations of the mobile station 101 and the base station 102.

The mobile station and the base station in the exemplary embodiments described below have a similar structure to the above, and the functions described above may be realized in a hardware- or software-based manner.

Effects of the First Exemplary Embodiment

As described above for the first exemplary embodiment, the present invention makes it possible to adaptively control a timer for determining for each mobile station (UE) whether it is in a deemed in-sync state or in a deemed out-of-sync state. By this, the probability can be reduced that a mobile station actually in sync is judged to be out of sync. In the case of LTE, it is also possible to reduce the probability that a latency before transmission of data caused by the necessity for a mobile station (UE) actually in sync to transmit a Non-sync RACH before transmitting a Scheduling Request.

Second Exemplary Embodiment

Figure 19:
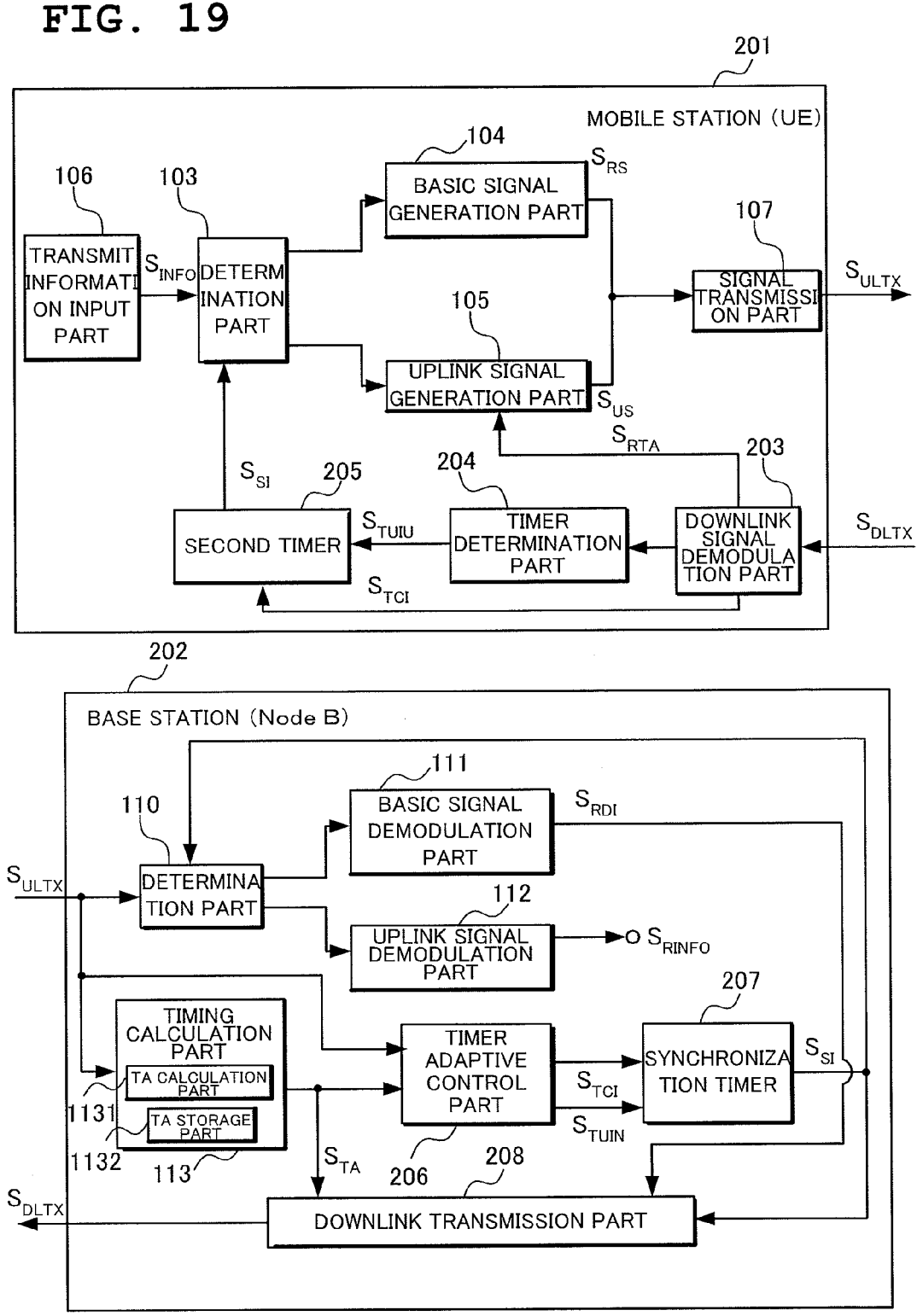
FIG. 19 is a block diagram for explaining a second exemplary embodiment of the present invention.

FIG. 19 is a block diagram showing the system structure of a wireless communication system according to a second exemplary embodiment of the present invention. In this exemplary embodiment, the calculation of an indicator value for determining the length of the first and second timers, as well as the determination of the length of the first timer, are performed by the base station, and the determination of the length of the second timer is performed by the mobile station.

With reference to FIG. 19, the mobile station (UE) 201 comprises a determination part 103, a basic signal generation part 104, an uplink signal generation part 105, a transmit information input part 106, a signal transmission part 107, a downlink signal demodulation part 203, a timer determination part 204 and a second timer 205.

At the mobile station (UE #m) 201, the downlink signal demodulation part 203 receives from the base station (Node B) 202 a downlink receive signal $S_{DLTX}$, which contains a timing advance (TA) for a transmit timing, and outputs the reproduced timing advance (TA) $S_{RTA}$, which corresponds to the received timing advance (TA); timer control information $S_{TCI}$, which notifies a reset of the second timer when a timing advance (TA) is notified from the base station (Node B); and a reproduced indicator value $S_{RID}$, which corresponds to the indicator used for determination by the base station (Node B) of the length of the first timer #m if the first timer #m is updated at the base station (Node B).

The timer determination part 204 determines the length of the second timer using the reproduced indicator value $S_{RID}$ as input, and outputs the result as timer update information $S_{TUIU}$.

The second timer 205 operates according to the timer control information $S_{TCI}$ and the timer update information $S_{TUIU}$. When the timer update information $S_{TUIU}$ is inputted, the second timer 205 updates the length of the second timer, and outputs as state information $S_{SI}$ the information as to whether the mobile station (UE) #m is in a deemed in-sync state or in a deemed out-of-sync state.

When transmit information $S_{INFO}$ to be transmitted to the base station (Node B) is inputted, the determination part 103 switches connection according to the state information $S_{SI}$. More specifically, it switches connection to the uplink signal generation part 105 if the information indicates a deemed in-sync state or to the basic signal generation part 104 if the information indicates a deemed out-of-sync state.

The random access signal generation part 104 generates and outputs a random access signal $S_{RS}$, which is necessary to receive from the base station (Node B) a timing advance (TA) for synchronizing an uplink signal.

The uplink signal generation part 105 adjusts the transmit timing according to the reproduced timing advance (TA) $S_{RTA}$, and generates and outputs an uplink signal $S_{US}$ that contains the transmit information $S_{INFO}$.

As an uplink transmit signal $S_{ULTX}$, the signal transmission part 107 transmits the uplink signal $S_{US}$ if the mobile station is in a deemed in-sync state or the random access signal $S_{RS}$ if the mobile station is in a deemed out-of-sync state.

Referring to FIG. 19, the base station (Node B) 202 comprises a determination part 110, a basic signal demodulation part 111, an uplink signal demodulation part 112, a timing calculation part 113, a timer adaptive control part 206, a synchronization timer 207 and a downlink transmission part 208.

At the base station (Node B) 202, the determination part 110 switches connection according to the state information $S_{SI}$, which indicates the state of the mobile station (UE) #m. More specifically, it switches connection to the uplink signal demodulation part 112 if the information indicates a deemed in-sync state or to the basic signal demodulation part 111 if the information indicates a deemed out-of-sync state.

The basic signal demodulation part 111 outputs as random access detection information $S_{RDI}$ the information indicating a sequence that exceeds the pre-defined detection threshold, by using as input the uplink received signal $S_{ULTX}$ corresponding to the random access signal $S_{RS}$.

The uplink signal demodulation part 112 demodulates an uplink received signal $S_{ULTX}$, which corresponds to an uplink signal $S_{US}$, and outputs reproduced transmit information $S_{RINFO}$, which corresponds to transmit information $S_{INFO}$.

The timing calculation part 113 detects the receive timing of an uplink received signal $S_{ULTX}$ and, based on the receive timing, calculates and outputs the timing advance (TA) $S_{TA}$ to be notified to the mobile station (UE) #m.

The timer adaptive control part 206, using as input both or either of an uplink received signal $S_{ULTX}$ and/or a timing advance (TA) $S_{TA}$, calculates as indicator value information $S_{ID}$ an indicator for determining the length of the first timer #m and the second timer of the mobile station (UE) #m. Using the indicator value information $S_{ID}$, it determines the length of the first timer #m as timer update information $S_{TUIN}$. The timer adaptive control part 206 then outputs the resultant indicator value information $S_{ID}$, the resultant timer update information $S_{TUIN}$, as well as the information which notifies an update of the first timer #m by sending a timing advance (TA) to the mobile station (UE) #m as timer control information $S_{TCI}$. The indicator value information $S_{ID}$ indicates the traveling speed and the variation in the transmit timing that have actually been used for determination of the timer length.

The synchronization timer 207, which has an M number of first timers, operates according to the timer update information $S_{TUIN}$ and the timer control information $S_{TCI}$, and outputs as state information $S_{SI}$ the information as to whether the mobile station (UE) #m is in a deemed in-sync state or in a deemed out-of-sync state.

The downlink transmission part 208, according to the state information $S_{SI}$ generates and transmits a downlink transmit signal $S_{DLTX}$. The downlink transmit signal $S_{DLTX}$ contains a timing advance (TA) $S_{TA}$ and indicator value information $S_{ID}$ in the case of a deemed in-sync state or contains a timing advance (TA) $S_{TA}$, indicator value information $S_{ID}$ and random access detection information $S_{RDI}$ in the case of a deemed out-of-sync state.

When determining the length of the first timer #m, the timer adaptive control part 206 uses as an indicator both or either of a traveling speed $S_{VT}$, which is the result obtained by estimating the traveling speed of the mobile station (UE) #m, and/or transmit timing variation information $S_{TADI}$, which is the result obtained by calculating a time variation in the timing advance (TA) and outputs one or both of these, as applicable, as indicator value information $S_{ID}$.

Figure 20:
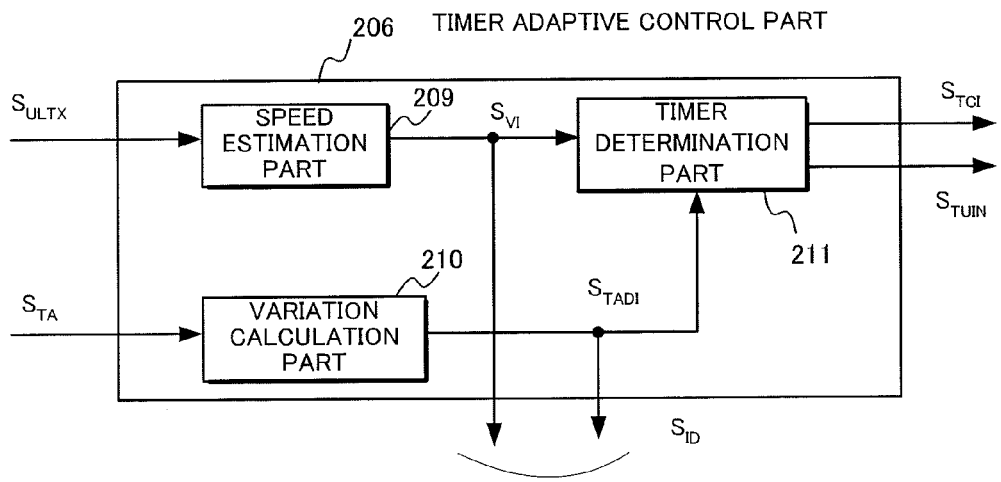
FIG. 20 is a block diagram for explaining the timer adaptive control part according to the second exemplary embodiment of the present invention.
Figure 21:
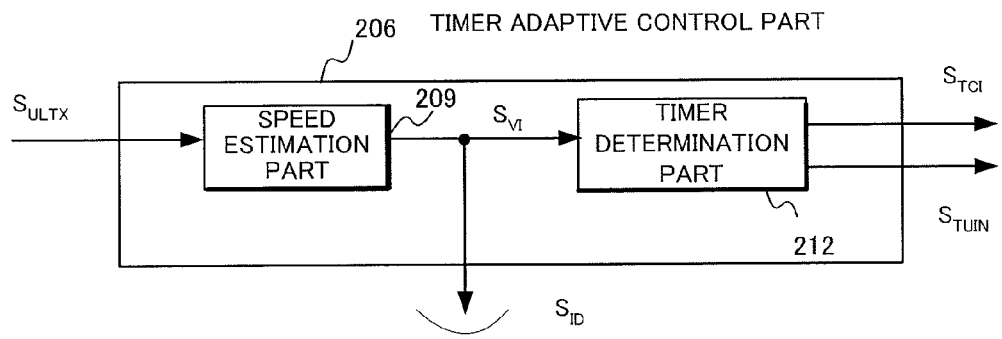
FIG. 21 is a block diagram for explaining the timer adaptive control part according to the second exemplary embodiment of the present invention.
Figure 22:
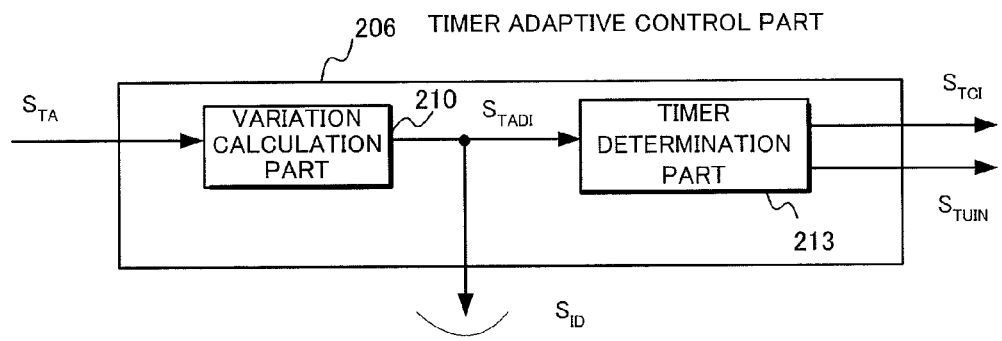
FIG. 22 is a block diagram for explaining the timer adaptive control part according to the second exemplary embodiment of the present invention.

FIGS. 20 to 22 show the structure of the timer adaptive control part when using as an indicator a traveling speed and a time variation in a timing advance (TA); a traveling speed; or a time variation in a timing advance (TA), respectively.

The timer adaptive control part 206 of FIG. 20 comprises a speed estimation part 209, which estimates the traveling speed $S_{VT}$ of the mobile station (UE) #m by using as input an uplink received signal $S_{ULTX}$; a variation calculation part 210, which calculates and outputs the time variation $S_{TADI}$ in the timing advance (TA) by using as input a timing advance (TA) $S_{TA}$; and a timer determination part 211, which determines the length of the first timer #m by using as input the traveling speed $S_{VT}$ and the time variation $S_{TADI}$ in the timing advance (TA). The timer adaptive control part 206 outputs the traveling speed $S_{VT}$ and the time variation $S_{TADI}$ in the timing advance (TA) as indicator value information $S_{ID}$.

The timer adaptive control part 206 of FIG. 21 comprises a speed estimation part 209, which estimates the traveling speed $S_{VT}$ of the mobile station (UE) #m by using as input an uplink received signal $S_{ULTX}$, and a timer determination part 212, which determines by using the traveling speed $S_{VT}$ as input the timer length for the first timer #m. The timer adaptive control part 206 outputs the traveling speed $S_{VT}$ as indicator value information $S_{ID}$.

The timer adaptive control part 206 of FIG. 22 comprises a variation calculation part 210, which calculates and outputs the time variation $S_{TADI}$ in the timing advance (TA) by using a timing advance (TA) $S_{TA}$ as input, and a timer determination part 213, which determines by using the time variation $S_{TADI}$ in the timing advance (TA) as input the timer length for the first timer #m and outputs the time variation $S_{TADI}$ of the timing advance (TA) as indicator value information $S_{ID}$.

Figure 23:
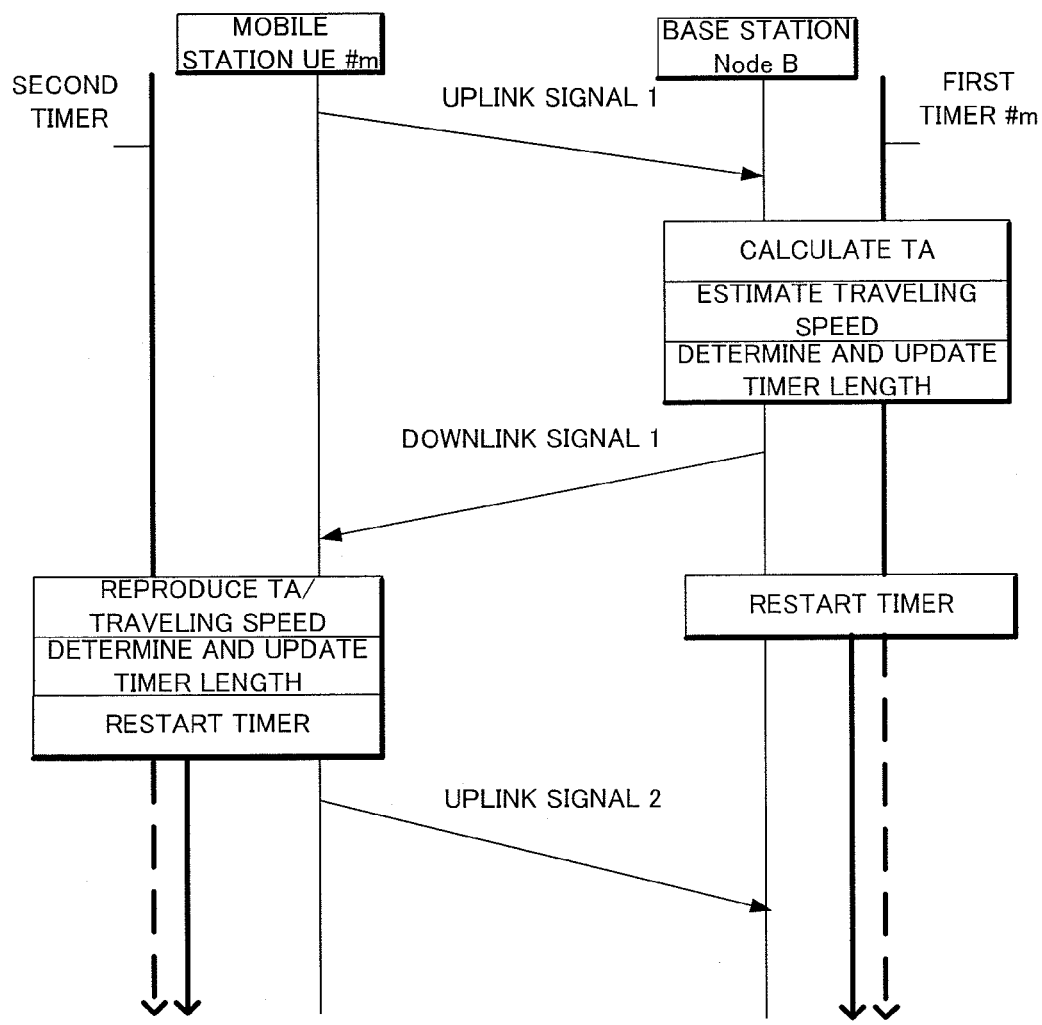
FIG. 23 is a diagram for explaining the procedure to determine a timer length according to the second exemplary embodiment of the present invention.

FIG. 23 is a diagram for explaining the procedure to determine and update the length of the first and second timers according to the second exemplary embodiment. The timer adaptive control part 206 is assumed to comprise a speed estimation part 209 and a timer determination part 210 (FIG. 21). The timer determination part 204, 212 determines the length of the first and second timers, based on the traveling speed $S_{VT}$ and the table which pre-defines correlations between traveling speed and timer length.

The base station (Node B) performs the reception of an uplink signal 1 from the mobile station (UE) #m, the calculation of a timing advance (TA) and the estimation of a traveling speed. The base station (Node B) causes the timer determination part 206 to determines the length of first timer #m based on the traveling speed and the table, updates the length of the first timer #m, and notifies the timing advance (TA) and the traveling speed to the mobile station (UE) #m via a downlink signal 1.

Immediately after transmitting the downlink signal 1 to the mobile station (UE) #m, the base station (Node B) resets the first timer #m and causes the first timer #m to start operating again.

The mobile station (UE) #m demodulates the downlink signal 1 to reproduce the timing advance (TA) and the traveling speed. The mobile station (UE) #m determines the length of the second timer through the timer determination part 204 based on the reproduced traveling speed and the table, updates the length of the second timer and causes the second timer to start operating again. The mobile station (UE) #m then adjusts the transmit timing according to the reproduced timing advance (TA) and transmits an uplink signal 2.

If the same indicator is used as the first exemplary embodiment, the above-described adaptive control process using the table is performed similarly to the first exemplary embodiment.

A possible signal that can be used by the speed estimation part of the base station (Node B) for estimation of a traveling speed is a known signal (Reference Signal: RS) for demodulating the data from the mobile station (UE) transmitted via the Uplink Shared Channel (UL-SCH) and the uplink signal including the control information, or an RS for CQI measurement which is transmitted to allow the base station (Node B) to measure the quality of an uplink line (Channel Quality Indicator: CQI) transmitted via a UL-SCH. Also, a possible signal that can be used for notifying a traveling speed is a signal for data transmission (Physical Downlink Shared Channel: PDSCH) transmitted via a Downlink Shared Channel (DL-SCH).

Effects of the Second Exemplary Embodiment

As described above for the second exemplary embodiment, the present invention makes it possible to adaptively control a timer for determining on a per-mobile-station (UE) basis whether it is in a deemed in-sync state or in a deemed out-of-sync state. By this, the probability can be reduced that a mobile station actually in sync is judged to be out of sync. In the case of LTE, it is also possible to reduce the probability that a latency before transmission of data caused by the necessity for a mobile station (UE) actually in sync to transmit a Non-sync RACH before transmitting a Scheduling Request.

Third Exemplary Embodiment

Figure 24:
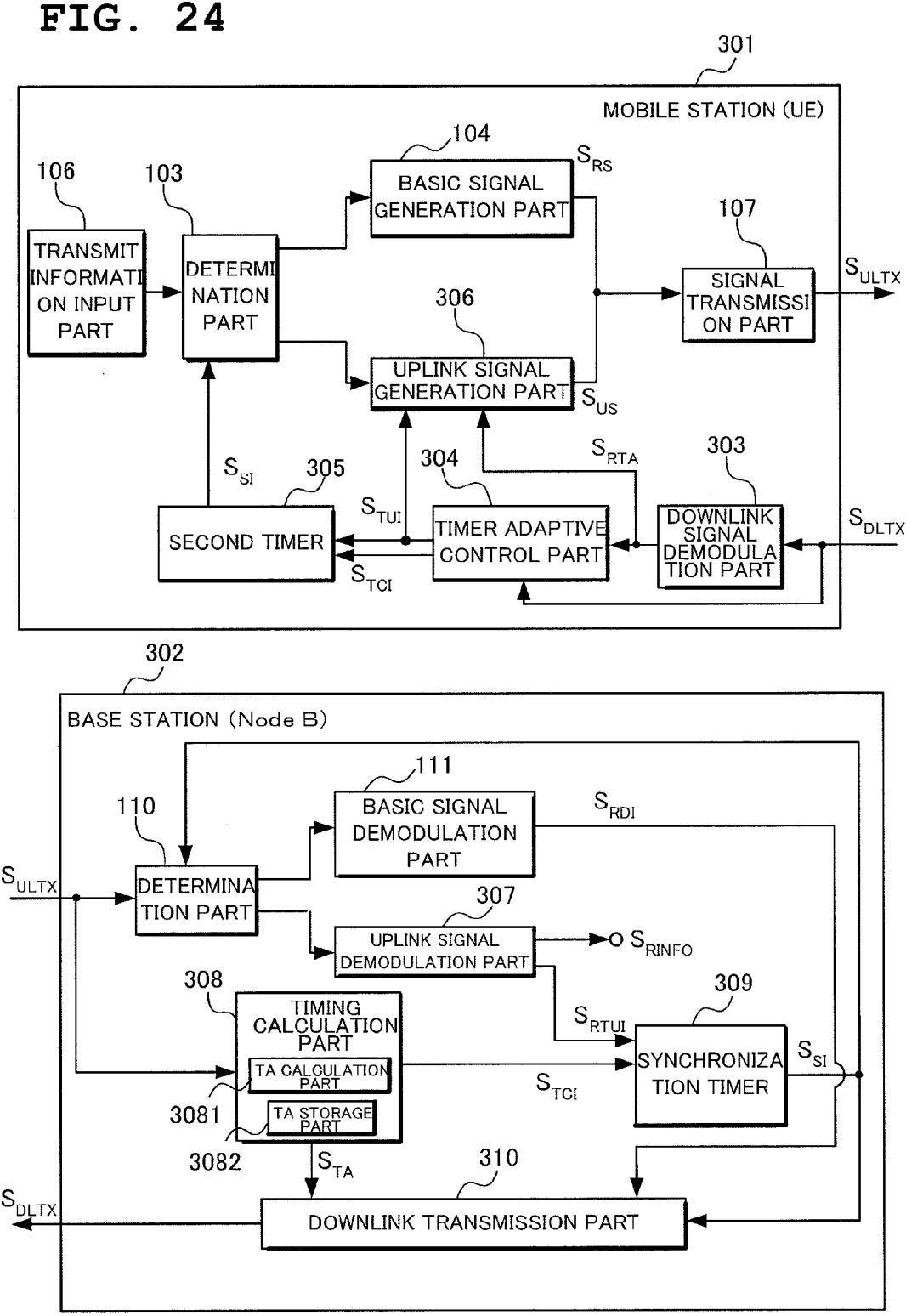
FIG. 24 is a block diagram for explaining a third exemplary embodiment of the present invention.

FIG. 24 is a block diagram showing the system structure of a wireless communication system according to a third exemplary embodiment of the present invention. In this exemplary embodiment, the calculation of an indicator value for determining the length of the first and second timers, as well as the determination of the length of the first and second timers, are performed by the mobile station.

With reference to FIG. 24, the mobile station (UE) 301 comprises a determination part 103, a basic signal generation part 104, a transmit information input part 106, a signal transmission part 107, a downlink signal demodulation part 303, a timer adaptive control part 304, a second timer 305, and an uplink signal generation part 306.

At the mobile station (UE #m) 301, the downlink signal demodulation part 303 receives from the base station (Node B) 302 a downlink receive signal $S_{DLTX}$ which contains a timing advance (TA) for a transmit timing, and outputs the reproduced timing advance (TA) $S_{RTA}$, which corresponds to the received timing advance (TA).

The timer adaptive control part 304, using as input both or either of the reproduced timing advance (TA) $S_{RTA}$ and/or a downlink receive signal $S_{DLTX}$, determines the length of the first timer #m and the second timer as timer update information $S_{TUI}$. It then outputs timer control information $S_{TCI}$, which notifies a reset of the second timer when the reproduced timing advance (TA) is inputted or when the length of the second timer is updated.

The second timer 305 operates according to the timer control information $S_{TCI}$ and the timer update information $S_{TUI}$, and outputs as state information $S_{SI}$ the information as to whether the mobile station (UE) #m is in a deemed in-sync state or in a deemed out-of-sync state.

When transmit information $S_{INFO}$ to be transmitted to the base station (Node B) is inputted, the determination part 103 switches connection according to the state information $S_{SI}$. More specifically, it switches connection to the uplink signal generation part 306 if the information indicates a deemed in-sync state or to the basic signal generation part 104 if the information indicates a deemed out-of-sync state.

The basic signal generation part 104 generates and outputs a random access signal $S_{RS}$, which is necessary to receive from the base station (Node B) a timing advance (TA) for synchronizing an uplink signal.

The uplink signal generation part 306 adjusts the transmit timing according to the reproduced timing advance (TA) $S_{RTA}$, and generates and outputs an uplink signal $S_{US}$ that contains the transmit information $S_{INFO}$ and the timer update information $S_{TUI}$.

As an uplink transmit signal $S_{ULTX}$, the signal transmission part 107 transmits the uplink signal $S_{US}$ if the mobile station is in a deemed in-sync state or the random access signal $S_{RS}$ if the mobile station is in a deemed out-of-sync state.

Referring to FIG. 24, the base station (Node B) 302 comprises a determination part 110, a basic signal demodulation part 111, an uplink signal demodulation part 307, a timing calculation part 308, a synchronization timer 309 and a downlink transmission part 310.

At the base station (Node B) 302, the determination part 110 switches connection according to the state information $S_{SI}$, which indicates the state of the mobile station (UE) #m. More specifically, it switches connection to the uplink signal demodulation part 307 if the information indicates a deemed in-sync state or to the basic signal demodulation part 111 if the information indicates a deemed out-of-sync state.

The basic signal demodulation part 111 outputs as random access detection information $S_{RDI}$ the information indicating a sequence that exceeds the pre-defined detection threshold, by using as input the uplink received signal $S_{ULTX}$ corresponding to the random access signal $S_{RS}$.

The uplink signal demodulation part 307 demodulates an uplink received signal $S_{ULTX}$, which corresponds to an uplink signal $S_{US}$, and outputs reproduced transmit information $S_{RINFO}$, which corresponds to transmit information $S_{INFO}$ and the reproduced timer update information $S_{RTUI}$, which corresponds to the timer update information $S_{TUI}$.

The timing calculation part 308 has a TA calculation part 3081 and a TA storage part 3082. The timing calculation part 308 uses the TA calculation part 3081 to detect the receive timing (i.e., a deviation in the receive timing) for an uplink received signal $S_{ULTX}$. The timing calculation part 308 calculates a timing advance (TA) $S_{TA}$ to notify to the mobile station (UE) #m based on the detected receive timing, and stores the resultant TA in the TA storage part 3082. It then outputs the timing advance (TA), as well as the information which notifies an update of the first timer #m by sending a timing advance (TA) to the mobile station (UE) #m as timer control information $S_{TCI}$.

The synchronization timer 309, which has an M number of first timers, operates according to the reproduced timer update information $S_{RTUI}$ and the timer control information $S_{TCI}$, and outputs as state information $S_{SI}$ the information as to whether the mobile station (UE) #m is in a deemed in-sync state or in a deemed out-of-sync state.

The downlink transmission part 310, according to the state information $S_{SI}$, generates and transmits a downlink transmit signal $S_{DLTX}$. The downlink transmit signal $S_{DLTX}$ contains a timing advance (TA) $S_{TA}$ in the case of a deemed in-sync state or contains a timing advance (TA) $S_{TA}$ and random access detection information $S_{RDI}$ in the case of a deemed out-of-sync state.

Figure 25:
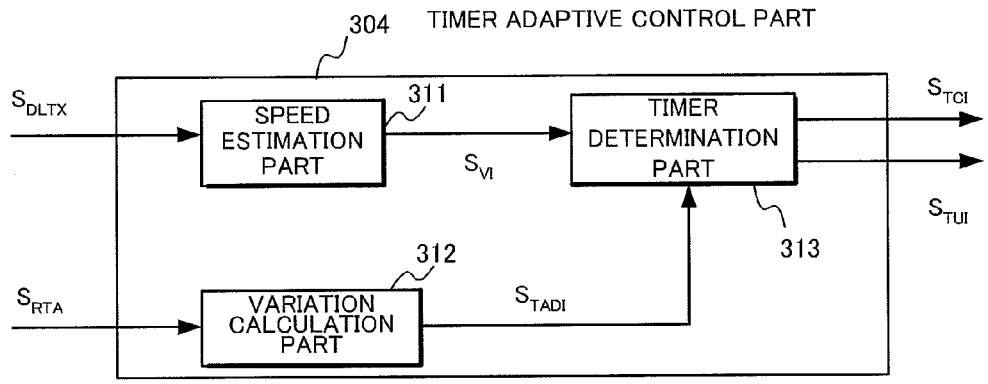
FIG. 25 is a block diagram for explaining the timer adaptive control part according to the third exemplary embodiment of the present invention.

When determining the length of the first timer #m and the second timer of the mobile station (UE) #m, the timer adaptive control part 304 uses as an indicator both or either of a traveling speed $S_{VT}$, which is the result obtained by estimating the traveling speed of the mobile station (UE) #m, and/or transmit timing variation information $S_{TADI}$, which is the result obtained by calculating a time variation for the reproduced timing advance (TA) $S_{RTA}$. FIG. 25 shows the structure of the timer adaptive control part 304 when using as indicators both a traveling speed and a time variation in a reproduced timing advance (TA).

The timer adaptive control part 304 of FIG. 25 comprises a speed estimation part 311, which estimates the traveling speed $S_{VT}$ of the mobile station (UE) #m by using as input a downlink receive signal $S_{DLTX}$; a variation calculation part 312, which calculates and outputs the time variation $S_{TADI}$ in the reproduced timing advance (TA) by using as input the reproduced timing advance (TA) $S_{RTA}$; and a timer determination part 313, which determines the length of the first timer #m and the second timer of the mobile station (UE) #m by using as input the traveling speed $S_{VT}$ and the time variation $S_{TADI}$ in the reproduced timing advance (TA). The timer adaptive control part which comprises either of a speed estimation part 311 or a variation calculation part 312, as well as a timer determination part 313, will be omitted from the description because it is the same as the first exemplary embodiment described above (see FIGS. 3 and 10).

Figure 26:
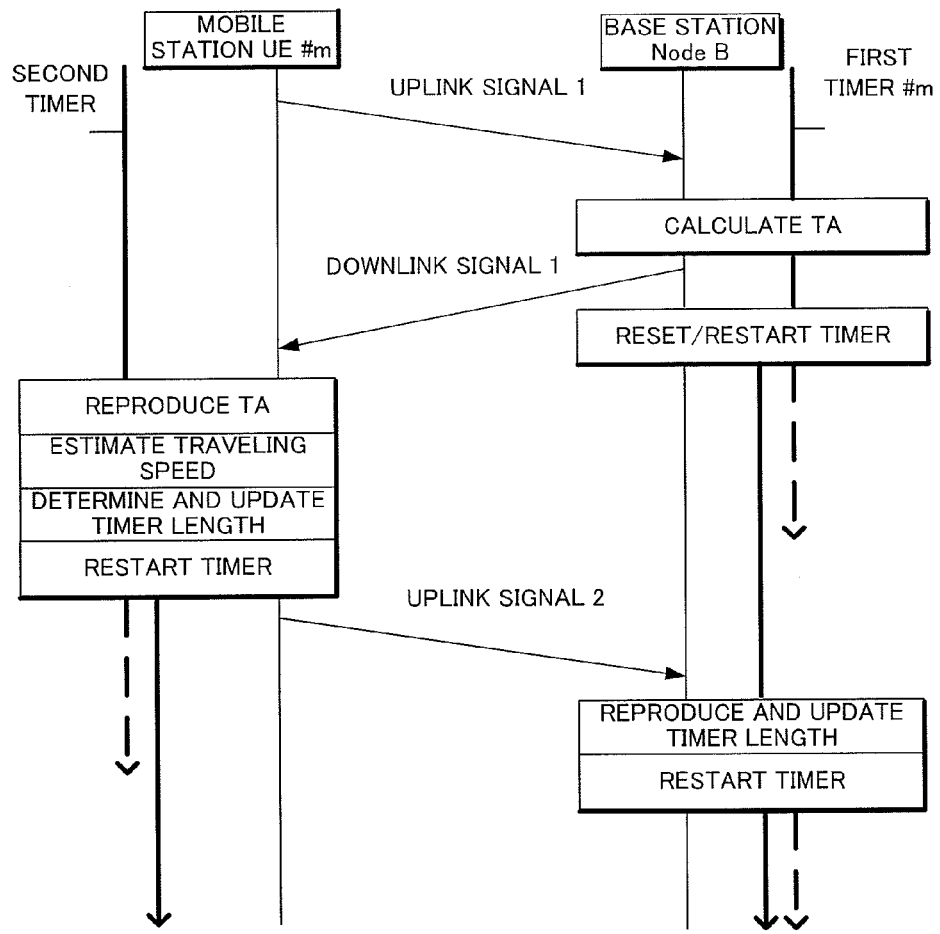
FIG. 26 is a diagram for explaining the procedure to determine a timer length according to the third exemplary embodiment of the present invention.

FIG. 26 is a diagram for explaining the procedure to determine and update a timer length according to the third exemplary embodiment. The timer adaptive control part 304 is assumed to comprise a speed estimation part and a timer determination part. The timer determination part determines the length of the timers, based on the traveling speed $S_{VT}$ and the table which pre-defines correlations between traveling speed and timer length.

The base station (Node B) receives an uplink signal 1 from the mobile station (UE) #m and calculates a timing advance (TA). Immediately after notifying the timing advance (TA) to the mobile station (UE) #m, the base station (Node B) resets the first timer #m and causes the first timer #m to start operating again.

The mobile station (UE) #m receives a downlink signal 1 and performs the reproduction of a timing advance (TA) and the estimation of a traveling speed. The mobile station (UE) #m determines the length of the first timer #m and the second timer, based on the estimated traveling speed and the table. The mobile station (UE) #m then updates and resets the second timer and causes the second timer to start operating again. The mobile station (UE) #m adjusts the transmit timing according to the reproduced timing advance (TA) and notifies the length of the first timer #m via an uplink signal to the base station.

The base station (Node B) receives the uplink signal 2 and reproduces the length of the first timer #m determined by the mobile station (UE) #m. The base station (Node B) then updates the length of the first timer #m according to the reproduced value and causes the first timer #m to start operating again.

A possible signal that can be used by the speed estimation part of the mobile station (UE) for estimation of a traveling speed is a known signal (Reference Signal: RS, which is also called "Common Pilot Channel: CPICH"), which is transmitted via a Downlink Shared Channel (DL-SCH). Also, a possible uplink signal that can be used for notifying the length of the timer is a signal for data transmission (Physical Uplink Shared Channel: PUSCH) transmitted via an Uplink Shared Channel (UL-SCH).

Effects of the Third Exemplary Embodiment

As described above for the third exemplary embodiment, the present invention makes it possible to adaptively control a timer for determining on a per-mobile-station (UE) basis whether it is in a deemed in-sync state or in a deemed out-of-sync state. By this, the probability can be reduced that a mobile station (UE) actually in sync is judged to be out of sync. In the case of LTE, it is also possible to reduce the probability that a latency before transmission of data caused by the necessity for a mobile station (UE) actually in sync to transmit a Non-sync RACH before transmitting a Scheduling Request. In the case where the mobile station (UE) determines the length of the first timer held by the base station (Node B), as is the case with this exemplary embodiment, a downlink signal from the base station (Node B) may become necessary to indicate a permission of updating the length of the first timer.

Fourth Exemplary Embodiment

Figure 27:
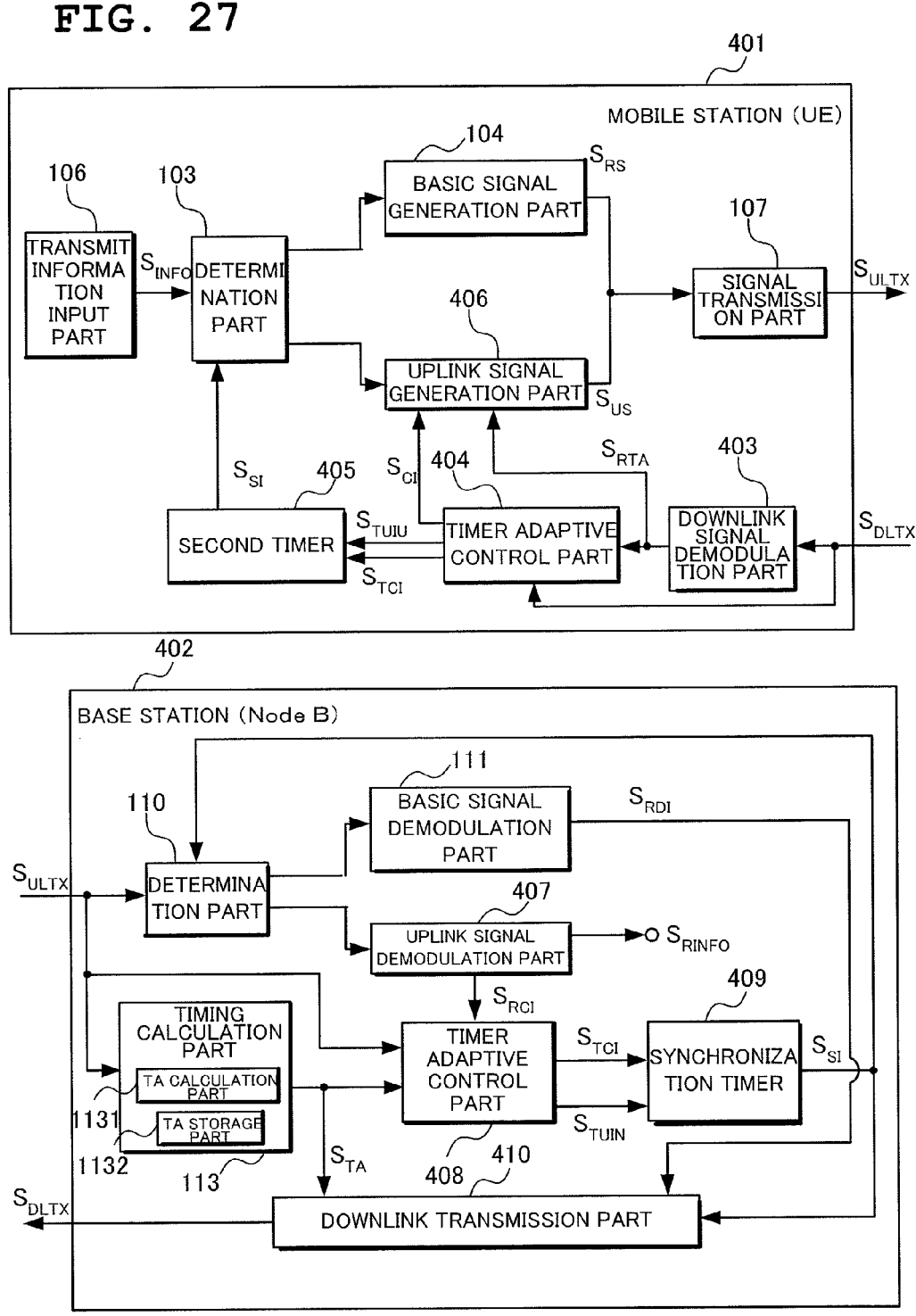
FIG. 27 is a block diagram for explaining a fourth exemplary embodiment of the present invention.

FIG. 27 is a block diagram showing the system structure of a wireless communication system according to a fourth embodiment of the invention. In this exemplary embodiment, the calculation of an indicator value for determining the length of the first timer, as well as the determination of the length of the first timer, are performed by the base station, and the calculation of an indicator value for determining the length of the second timer, as well as the determination of the length of the second timer, are performed by the mobile station. It should be noted that the information used for calculation of an indicator value must be the same between the base station and the mobile station, so that the indicator value calculated by the base station and the indicator value calculated by the mobile station will become identical. In addition, control information $S_{CI}$ and reproduced control information $S_{RCI}$ described later are conditional information necessary for measurement, rather than indicator values. For example, the information would be a Doppler frequency if a traveling speed is used as an indicator.

Referring to FIG. 27, the mobile station (UE) 401 comprises a determination part 103, a basic signal generation part 104, a transmit information input part 106, a signal transmission part 107, a downlink signal demodulation part 403, a timer adaptive control part 404, a second timer 405, and an uplink signal generation part 406.

At the mobile station (UE #m) 401, the downlink signal demodulation part 403 receives from the base station (Node B) 402 a downlink receive signal $S_{DLTX}$, which contains a timing advance (TA) for a transmit timing, and outputs the reproduced timing advance (TA) $S_{RTA}$, which corresponds to the received timing advance (TA).

The timer adaptive control part 404, using as input both or either of the reproduced timing advance (TA) $S_{RTA}$ and/or a downlink receive signal $S_{DLTX}$, determines the length of the second timer. It then outputs the resultant timer length as timer update information $S_{TUIU}$, as well as the information which notifies a reset of the second timer when the reproduced timing advance (TA) is inputted or when the length of the second timer is updated as timer control information $S_{TCI}$. In addition, the timer adaptive control part 404 also outputs as control information $S_{CI}$ the information used in the calculation of an indicator value for determining the length of the timer.

The second timer 405 operates according to the timer control information $S_{TCI}$ and the timer update information $S_{TUIU}$, and outputs as state information $S_{SI}$ the information as to whether the mobile station (UE) #m is in a deemed in-sync state or in a deemed out-of-sync state.

When transmit information $S_{INFO}$ to be transmitted to the base station (Node B) is inputted, the determination part 103 switches connection according to the state information $S_{SI}$. More specifically, it switches connection to the uplink signal generation part 406 if the information indicates a deemed in-sync state or to the basic signal generation part 104 if the information indicates a deemed out-of-sync state.

The basic signal generation part 104 generates and outputs a random access signal $S_{RS}$, which is necessary to receive from the base station (Node B) a timing advance (TA) for synchronizing an uplink signal.

The uplink signal generation part 406 adjusts the transmit timing according to the reproduced timing advance (TA) $S_{RTA}$, and generates and outputs an uplink signal $S_{US}$ that contains the transmit information $S_{INFO}$ and the control information $S_{CI}$.

As an uplink transmit signal $S_{ULTX}$, the signal transmission part 107 transmits the uplink signal $S_{US}$ if the mobile station is in a deemed in-sync state or the random access signal $S_{RS}$ if the mobile station is in a deemed out-of-sync state.

Referring to FIG. 27, the base station (Node B) 402 comprises a determination part 110, a basic signal demodulation part 111, an uplink signal demodulation part 407, a timing calculation part 113, a timer adaptive control part 408, a synchronization timer 409 and a downlink transmission part 410.

At the base station (Node B) 402, the determination part 110 switches connection according to the state information $S_{SI}$, which indicates the state of the mobile station (UE) #m. More specifically, it switches connection to the uplink signal demodulation part 407 if the information indicates a deemed in-sync state or to the basic signal demodulation part 111 if the information indicates a deemed out-of-sync state.

The basic signal demodulation part 111 outputs as random access detection information $S_{RDI}$ the information indicating a sequence that exceeds the pre-defined detection threshold, by using as input the uplink received signal $S_{ULTX}$ corresponding to the random access signal $S_{RS}$.

The uplink signal demodulation part 407 demodulates an uplink received signal $S_{ULTX}$, which corresponds to an uplink signal $S_{US}$, and outputs the reproduced transmit information $S_{RINFO}$, which corresponds to transmit information $S_{INFO}$, as well as reproduced control information $S_{RCI}$, which corresponds to control information $S_{CI}$.

The timing calculation part 113 detects the receive timing of an uplink received signal $S_{ULTX}$ and, based on the receive timing, calculates and outputs the timing advance (TA) $S_{TA}$ to be notified to the mobile station (UE) #m.

The timer adaptive control part 408, using as input both or either of an uplink received signal $S_{ULTX}$ and/or a timing advance (TA) $S_{TA}$, determines the length of the first timer #m. It then outputs the resultant timer length as timer update information $S_{TUIN}$, as well as the information which notifies an update of the second timer by sending a timing advance (TA) to the mobile station (UE) #m as timer control information $S_{TCI}$.

The synchronization timer 409, which has an M number of first timers, operates according to the timer update information $S_{TUIN}$ and the timer control information $S_{TCI}$, and outputs as state information $S_{SI}$ the information as to whether the mobile station (UE) #m is in a deemed in-sync state or in a deemed out-of-sync state.

The downlink transmission part 410, according to the state information $S_{SI}$ generates and transmits a downlink transmit signal $S_{DLTX}$. The downlink transmit signal $S_{DLTX}$ contains a timing advance (TA) $S_{TA}$ in the case of a deemed in-sync state or contains a timing advance (TA) $S_{TA}$ and random access detection information $S_{RDI}$ in the case of a deemed out-of-sync state.

When determining a timer length, the timer adaptive control part 404 (408) uses as an indicator both or either of a traveling speed $S_{VT}$, which is the result obtained by estimating the traveling speed of the mobile station (UE) #m, and/or transmit timing variation information $S_{TADI}$, which is the result obtained by calculating a time variation in the reproduced timing advance (TA) $S_{RTA}$ (timing advance (TA) $S_{RTA}$).

Figure 28:
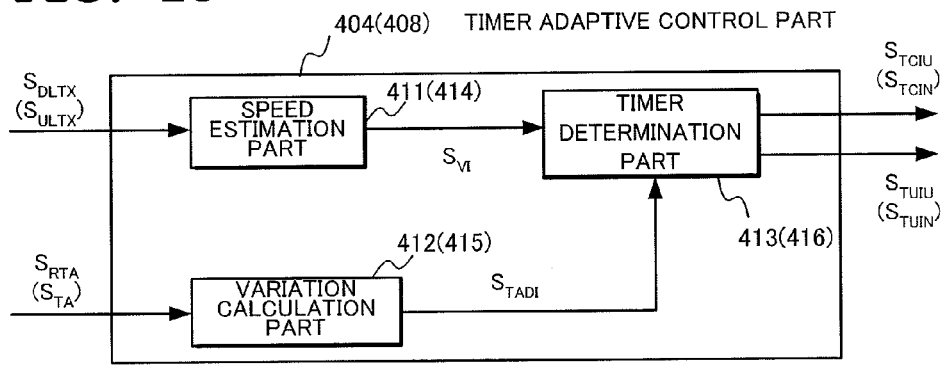
FIG. 28 is a block diagram for explaining the timer adaptive control part according to the fourth exemplary embodiment of the present invention.

FIG. 28 shows the structure of the timer adaptive control part 404 (408) when using as indicators both a traveling speed and a time variation in a reproduced timing advance (TA).

The timer adaptive control part 404 (408) of FIG. 28 comprises a speed estimation part 411 (414), which estimates the traveling speed $S_{VT}$ of the mobile station (UE) by using as input a downlink receive signal $S_{DLTX}$ (uplink received signal $S_{ULTX}$); a variation calculation part 412 (415), which calculates and outputs a time variation $S_{TADI}$ in the reproduced timing advance (TA) by using as input the reproduced timing advance (TA) $S_{RTA}$ (timing advance (TA) $S_{RTA}$); and a timer determination part 413 (416), which determines the length of the second timer of the mobile station (UE) #m (first timer #m) by using as input the traveling speed $S_{VI}$ and the time variation $S_{TADI}$ in the reproduced timing advance (TA).

The method to determine and update the length of the first and second timers according to the fourth exemplary embodiment can be explained by use of FIGS. 11 to 13 above.

The timer adaptive control part 404 (408) is assumed to comprise a variation calculation part 412 (415) and a timer determination part 413 (416) (FIG. 28). The timer determination part determines the length of the first (second) timer, based on the time variation in the reproduced timing advance (TA) and the table shown in FIG. 11 which pre-defines correlations between time variation in timing advance (TA) and timer length. In the description of this exemplary embodiment, the method to notify the amount of deviation in a transmit timing as an absolute value will be considered as a method to notify the timing advance.

As explained above, each of the timer lengths in the table of FIG. 11 has been calculated using the expressions (2) to (4) above, based on different correlations between an amount of deviation in transmit timing during an observation interval and a traveling speed at which such amount of deviation is expected to occur.

In the expression (2), $D_{TA}$ [usec] is the value of deviation in the transmit timing; v [km/h] is the traveling speed of the mobile station (UE); t [sec] is the time which causes a deviation of $D_{TA}$; and 6.7 [usec/km] is a Round Trip Delay (RTD), which is a propagation delay caused between the base station (Node B) and the mobile station (UE). In the expression (3), $\Delta$ d [usec] is the amount of deviation in the transmit timing caused over a period of $\Delta$t [sec].

In this exemplary embodiment, a case will be considered where the mobile station (UBE) has succeeded in demodulating a downlink receive signal and where the value of the reproduced timing advance (TA) matches the value of the timing advance (TA) calculated by the base station (Node B).

Suppose that the variation calculation part of the base station (Node B) calculates a time variation in a timing advance (TA) at regular time intervals, i.e., per 10 [sec], for a mobile station (UE) #1 and that the results are as shown in FIG. 12. At each of the times ($t_0$, $t_1$, $t_2$, $t_3$), the timer determination part determines the length of the first and second timers and controls these timers adaptively. It is assumed here that the initial value $T_{TM0}$ for the first and second timers is 1.5 [sec] as described before, which is the length of time determined to deal with a traveling speed of 350 [km/h].

The time variation in the timing advance (TA) of a mobile station (UE) #1 at $t_0$ calculated by the variation calculation part of the base station (Node B) is 2.18 [usec/10 sec]. Referring to the table of FIG. 11, the variation is between 0.56 [usec/10 sec] to 2.23 [usec/10 sec], so the timer length can be made longer than the initial value 1.5 [sec]. Based on the table, the length of the first timer #1 is determined to be 4.5 [sec] and the length of the first timer #1 is updated.

Immediately after notifying the timing advance (TA) to the mobile station (UE) #1, the base station (Node B) resets the first timer #1 and causes the first timer #1 to start operating again.

On the other hand, at time $t_0+\tau$ (where $\tau$ is a processing latency from when the base station (Node B) calculates a time variation in a timing advance (TA) until when the mobile station (UE) #1 calculates a time variation in the reproduced timing advance (TA)), the value of the time variation in the reproduced timing advance (TA) resulting from the calculation by the mobile station (UE) #1 is also 2.18 [usec/10 sec]. Therefore, the length of the second timer is determined to be 4.5 [sec], based on the table of FIG. 11. The mobile station (UE) #1 then updates and resets the second timer and causes the second timer to start operating again.

Similarly, the time variations in the timing advance (TA) at $t=t_1$, $t_2$, $t_3$ calculated by the base station (Node B) and the time variations in the reproduced timing advance (TA) at $t=t_1+\tau$, $t_2+\tau$, $t_3+\tau$ calculated by the mobile station (UE) #m are 1.45 [usec/10 sec], 1.92 [usec/10 sec] and 3.28 [usec/10 sec]. Referring to the table of FIG. 11, it can be determined that the lengths of the first timer #1 and second timer of the mobile station (UE) #1 are 4.5 [sec], 4.5 [sec] and 1.5 [sec], respectively.

FIG. 13 shows the results of determining the first and second timers as described above.

Figure 29:
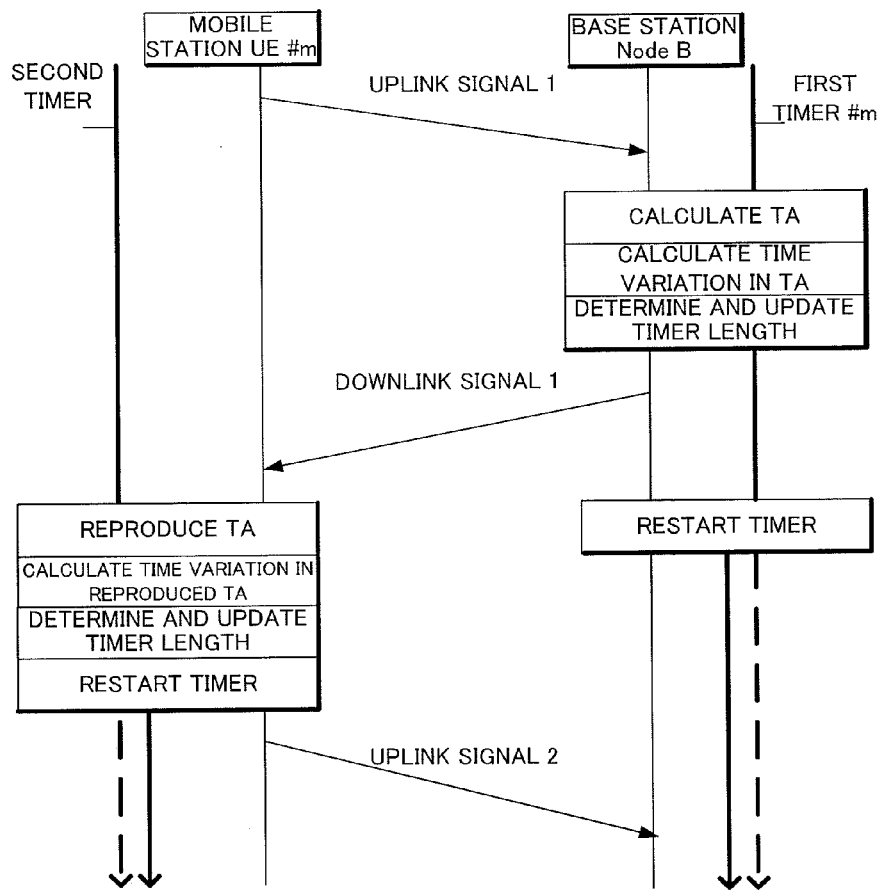
FIG. 29 is a diagram for explaining the procedure to determine a timer length according to the fourth exemplary embodiment of the present invention.

FIG. 29 is a diagram for explaining the procedure to determine and update a timer length according to the fourth exemplary embodiment.

The base station (Node B) receives an uplink signal 1 from the mobile station (UE) #m, calculates a timing advance (TA) and then calculates a time variation in the timing advance (TA). The base station (Node B) determines and updates the length of the first timer #m, based on the calculated time variation in the timing advance (TA) and the pre-defined table. Immediately after notifying the timing advance (TA) to the mobile station (UE) #m in a downlink signal 1, the base station (Node B) resets the first timer #m and causes the first timer #m to start operating again.

The mobile station (UE) #m receives and demodulates the downlink signal 1 to reproduce the timing advance (TA). The mobile station (UE) #m then calculates a time variation in the reproduced timing advance (TA), and determines the length of the second timer, based on the same pre-defined table as the one used by the base station (Node B). Immediately after updating the length of the second timer, the mobile station (UE) #m resets the second timer and causes the second timer to start operating again. If the mobile station (UE) #m is rotating around the base station (Node B) while traveling, it is desirable to determine a timer length using only a variation (time variation) as an indicator.

On the other hand, if a traveling speed is used as an indicator for determining a timer length in this exemplary embodiment, a possible method that can be used is to either of the base station (Node B) or the mobile station (UE) estimates a Doppler frequency from a known signal and notify the result of estimation to the other party.

As described above for the fourth exemplary embodiment, the present invention makes it possible to adaptively control a timer for determining on a per-mobile-station (UE) basis whether it is in a deemed in-sync state or in a deemed out-of-sync state.

Effects of the Fourth Exemplary Embodiment

According to this exemplary embodiment, by using the method described above, it becomes possible to reduce the probability that a mobile station actually in sync is judged to be out of sync, because the timer length can be controlled adaptively on a per-mobile-station basis. In the case of LTE, it is also possible to reduce the probability that a latency before transmission of data caused by the necessity for a mobile station (UE) actually in sync to transmit a Non-sync RACH before transmitting a Scheduling Request.

Although, in the exemplary embodiments of the present invention described above, the length of the timer used for determining whether the mobile station (UE) is in a deemed in-sync state or in a deemed out-of-sync state based on its traveling speed or a time variation in a timing advance (TA)

for a transmit timing, it is also possible to determine the timer length by taking into account the services performed by each mobile station (UE). This is because the reading time varies depending on which service is being performed. In this case, a longer timer length can be set for a longer reading time. It should be noted, however, that a longer timer length leads a greater possibility that a mobile station goes out of sync before a timeout. To prevent this problem from occurring, it is necessary to establish and set an appropriate timer length that is deemed within an acceptable tolerance.

In addition, position information from GPS or other similar sources may also be used as a means to estimate a traveling speed.

Fifth Exemplary Embodiment

Figure 30:
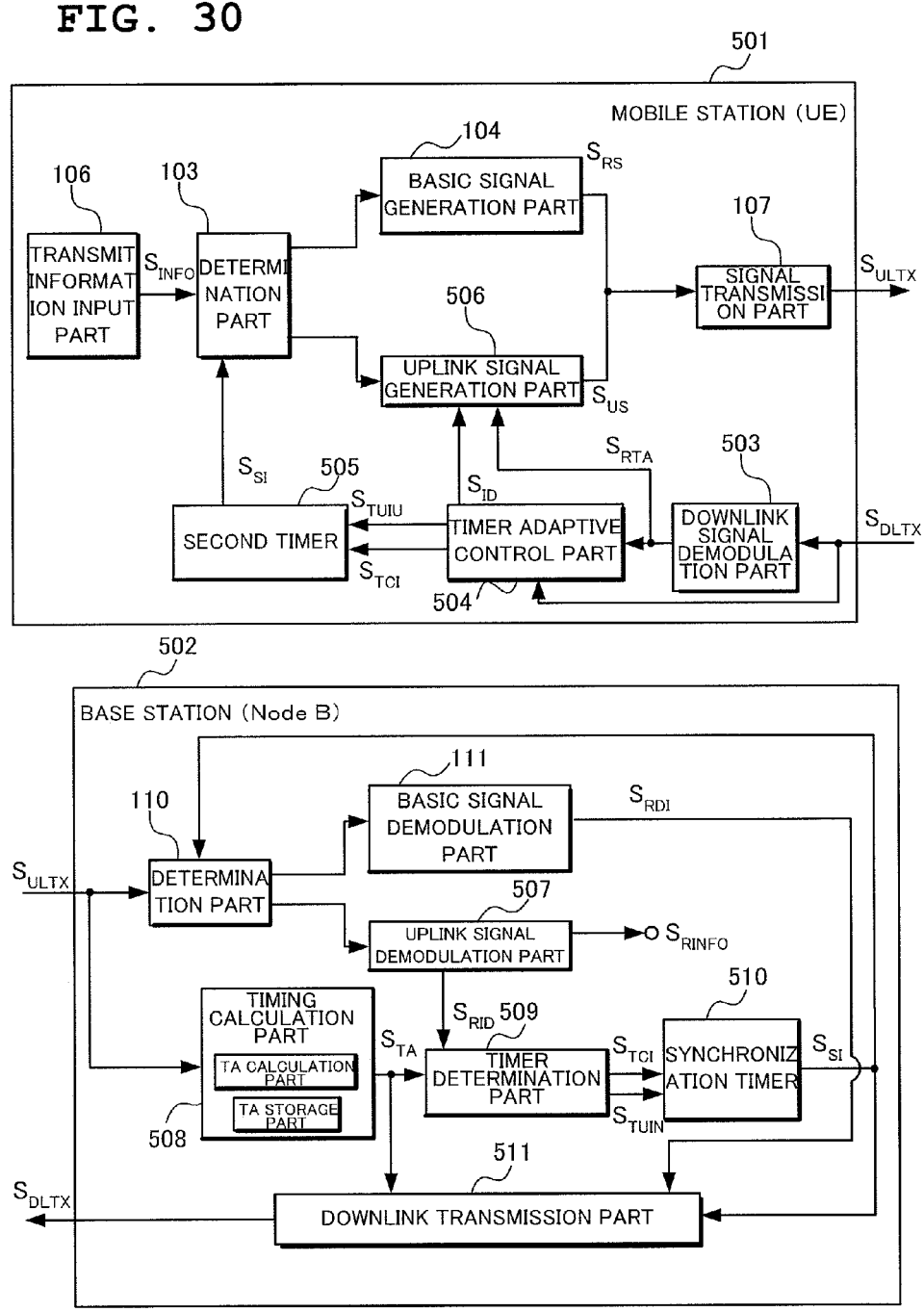
FIG. 30 is a block diagram showing the system structure of a wireless communication system according to a fifth exemplary embodiment of the present invention.

FIG. 30 is a block diagram showing the system structure of a wireless communication system according to a fifth embodiment of the present invention.

Referring to FIG. 30, the mobile station (UE) 501 comprises a determination part 103, a basic signal generation part 104, a transmit information input part 106, a signal transmission part 107, a downlink signal demodulation part 503, a timer adaptive control part 504, a second timer 505, and an uplink signal generation part 506.

Also referring to FIG. 30, the base station (Node B) 502 comprises a determination part 110, a basic signal demodulation part 111, an uplink signal demodulation part 507, a timing calculation part 508, a timer determination part 509, a synchronization timer 510 and a downlink transmission part 511.

In this exemplary embodiment, the mobile station (UE) #m calculates the value of an indicator based on which to estimate an in-sync period, determines the length of the second timer so that it will be inversely proportional to the indicator value, updates to the timer length thus determined and notifies the indicator value to the base station (Node B). The base station (Node B), on the other hand, determines the length of the first timer #m so that it will be inversely proportional to the reproduced indicator value and updates to the timer length thus determined.

Sixth Exemplary Embodiment

Figure 31:
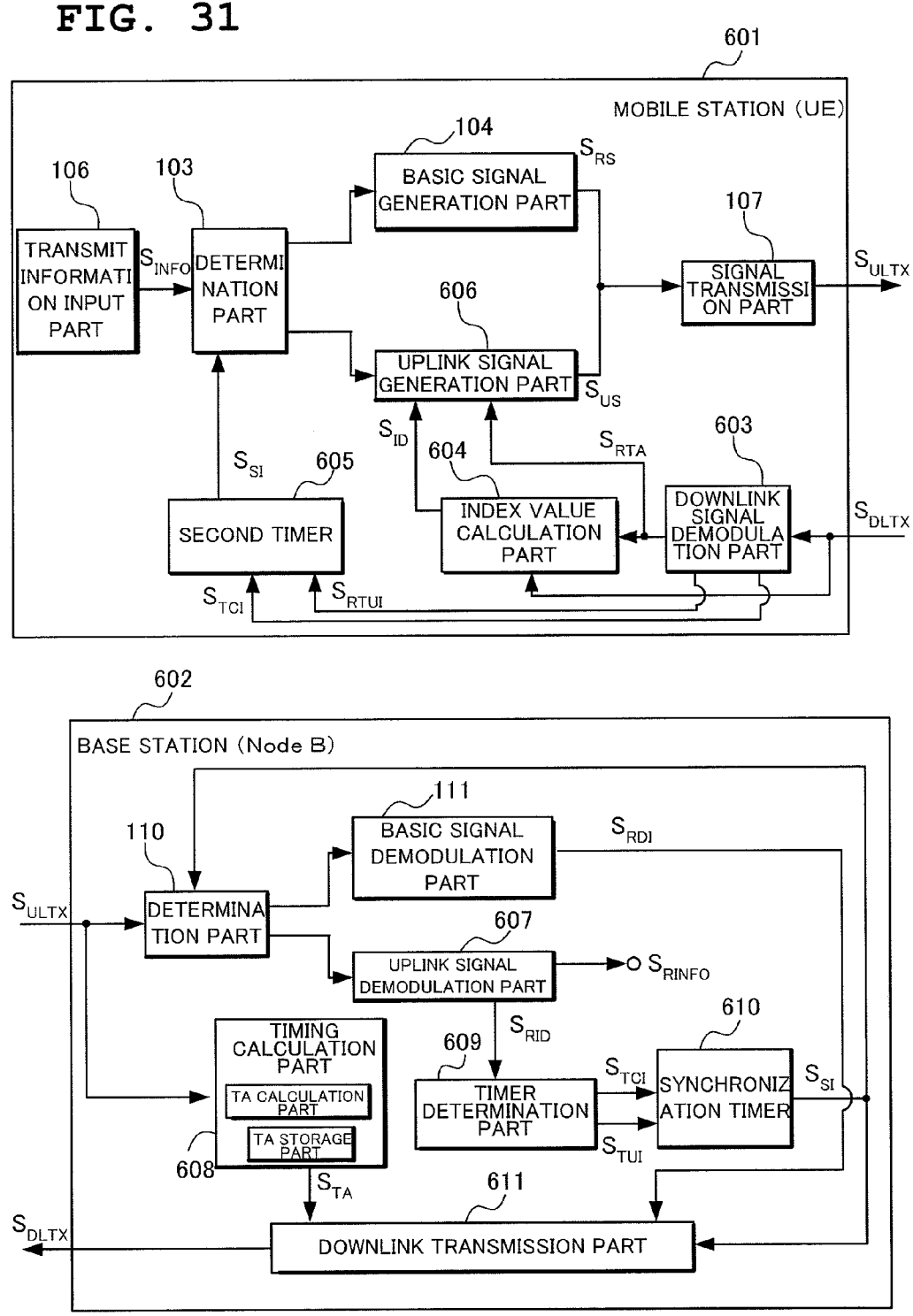
FIG. 31 is a block diagram showing the system structure of a wireless communication system according to a sixth exemplary embodiment of the present invention.

FIG. 31 is a block diagram showing the system structure of a wireless communication system according to a sixth embodiment of the present invention.

Referring to FIG. 31, the mobile station (UE) 601 comprises a determination part 103, a basic signal generation part 104, a transmit information input part 106, a signal transmission part 107, a downlink signal demodulation part 603, an indicator value calculation part 604, a second timer 605, and an uplink signal generation part 606. The indicator value calculation part 604 comprises at least either of the speed estimation part 344 and the variation calculation part 312 shown in FIG. 25.

Also referring to FIG. 31, the base station (Node B) 602 comprises a determination part 110, a basic signal demodulation part 111, an uplink signal demodulation part 607, a timing calculation part 608, a timer determination part 609, a synchronization timer 610 and a downlink transmission part 611.

In this exemplary embodiment, the mobile station (UE) #m calculates the value of an indicator based on which to estimate an in-sync period, and notifies the indicator value thus calculated to the base station (Node B). In turn, the base station (Node B) determines the length of both the first timer #m and the second timer of the mobile station (UE) #m so that it will be inversely proportional to the reproduced indicator value, updates the length of the first timer #1 and notifies the length of the second timer to the mobile station (UE) #m. The mobile station (UE) #m then reproduces the length of the second timer determined by the base station (Node B) and updates the length of the second timer accordingly.

Seventh Exemplary Embodiment

Figure 32:
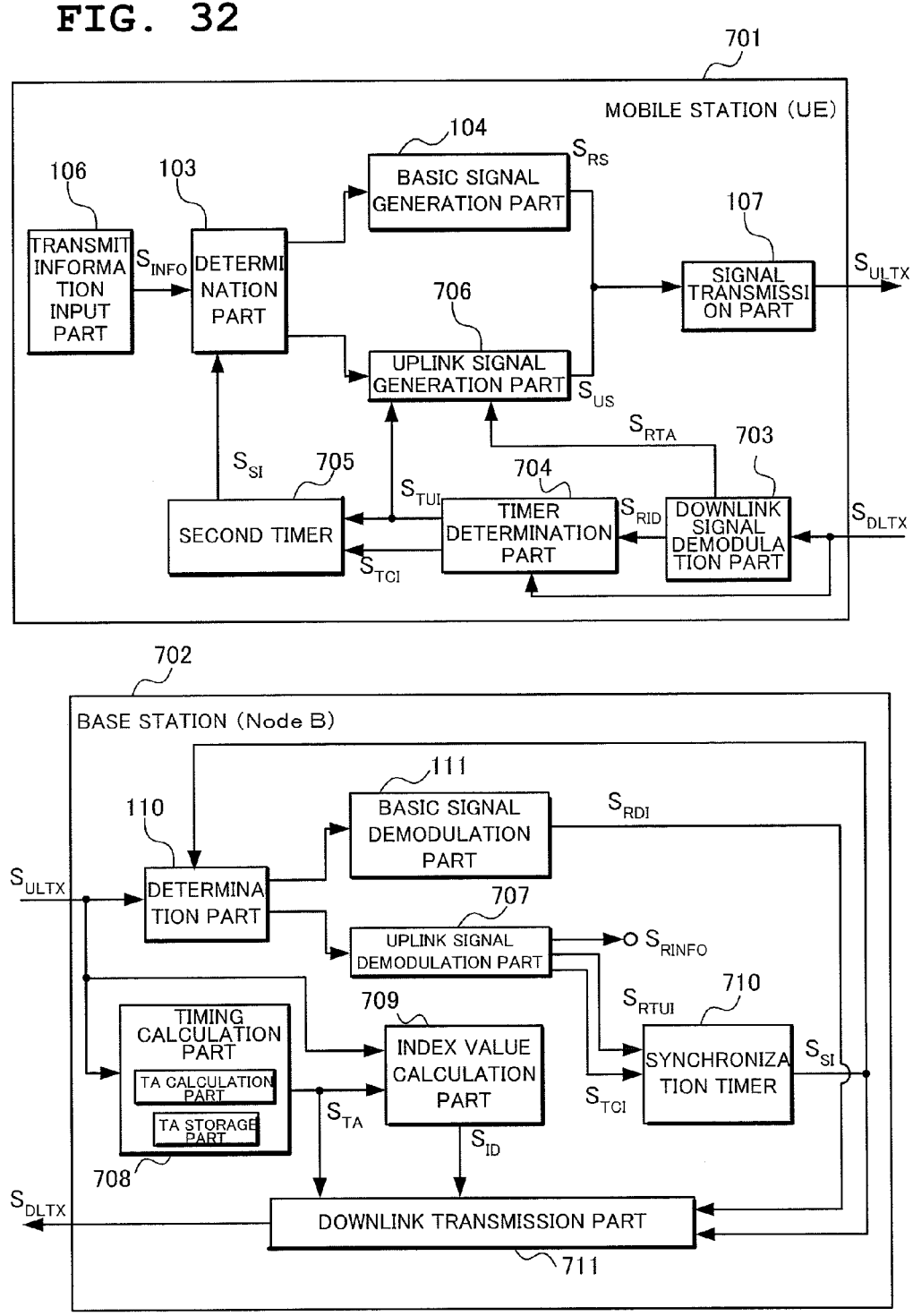
FIG. 32 is a block diagram showing the system structure of a wireless communication system according to a seventh exemplary embodiment of the present invention.

FIG. 32 is a block diagram showing the system structure of a wireless communication system according to a seventh exemplary embodiment of the present invention.

Referring to FIG. 32, the mobile station (UE) 701 comprises a determination part 103, a basic signal generation part 104, a transmit information input part 106, a signal transmission part 107, a downlink signal demodulation part 703, a timer determination part 704, a second timer 705, and an uplink signal generation part 706.

Also referring to FIG. 32, the base station (Node B) 702 comprises a determination part 110, a basic signal demodulation part 111, an uplink signal demodulation part 707, a timing calculation part 708, an indicator value calculation part 709, a synchronization timer 710 and a downlink transmission part 711. The indicator value calculation part 704 comprises at least either of the speed estimation part 118 and the variation calculation part 119 shown in FIGS. 3, 10 and 14.

In this exemplary embodiment, the base station (Node B) calculates the value of an indicator based on which to estimate an in-sync period, and notifies the indicator value thus calculated to the mobile station (UE) #m. In turn, the mobile station (UE) #m determines the length of both the first timer #m and the second timer so that it will be inversely proportional to the reproduced indicator value, updates the length of the second timer and notifies the length of the first timer #m to the base station (Node B). The base station (Node B) then reproduces the length of the first timer #m determined by the mobile station (UE) #m and updates the length of the first timer #m accordingly.

Referring to FIG. 32, the mobile station (UE) 701 comprises a determination part 103, a basic signal generation part 104, a transmit information input part 106, a signal transmission part 107, a downlink signal demodulation part 703, a timer adaptive control part 704, a second timer 705, and an uplink signal generation part 706.

Eighth Exemplary Embodiment

Figure 33:
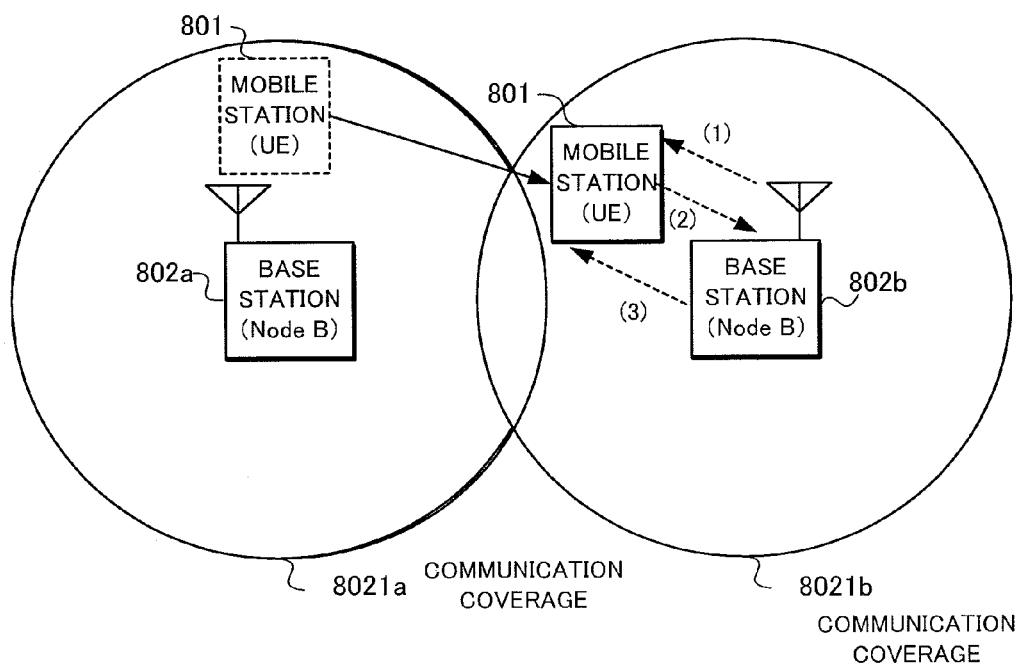
FIG. 33 is a diagram illustrating a schematic concept of a wireless communication system according to an eighth exemplary embodiment of the present invention.

FIG. 33 is a block diagram illustrating a schematic concept of a wireless communication system according to an eighth exemplary embodiment of the present invention. The mobile station (UE) 801 and the base station (Node B) of the present invention have one of the structures of the exemplary embodiments described above. The present invention is applied in such a manner that, when the mobile station (UE) 801 moves from within the communication coverage 8021*a* of the base station (Node B) 802*a* to the communication coverage 8021*b* of the base station (Node B) 802*b*, (1) the mobile station (UE) 801 receives a notification from the base station (Node B) 802*b*; (2) in response to such notification, the mobile station (UE) 801 notifies the latest timer length determined within the communication coverage 8021*a*, based on one of the structures of the above-described exemplary embodiments; and (3) the base station 802*b* in turn notifies the timer length setting value to the mobile station 801, using one of the methods described with respect to the above-described exemplary embodiments.

According to this exemplary embodiment, even when a mobile station (UE) leaves the communication coverage of a base station (Node B) to another, it becomes possible to perform control of a timer which is per-mobile-station (UE) basis adaptively for determining whether the mobile station is in a deemed in-sync state or in a deemed out-of-sync state between the mobile station (UE) and such another base station (Node B).

Ninth Exemplary Embodiment

Figure 34:
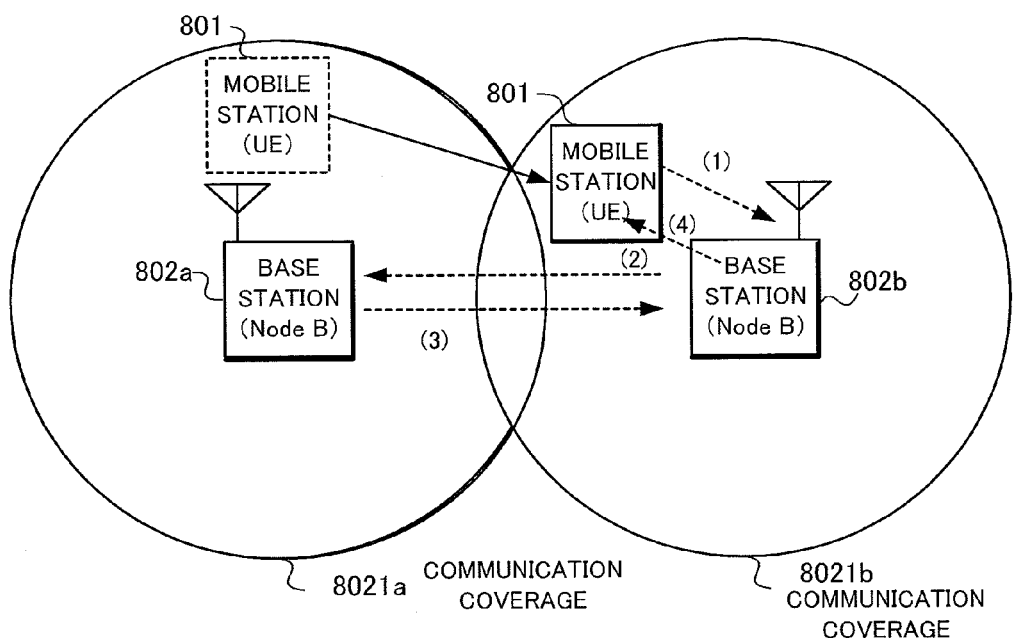
FIG. 34 is a diagram illustrating a schematic concept of a wireless communication system according to a ninth exemplary embodiment of the present invention.

FIG. 34 is a block diagram illustrating a schematic concept of a wireless communication system according to a ninth exemplary embodiment of the present invention. The mobile station (UE) and the base station (Node B) of this exemplary embodiment have one of the structures of the exemplary embodiments described above. The present invention is applied in such a manner that, when the mobile station (UE) 801 moves from within the communication coverage 8021*a* of the base station (Node B) 802*a* to the communication coverage 8021*b* of the base station (Node B) 802*b*, (1) the mobile station (UE) 801 responds in the manner described with respect to the above-described exemplary embodiments; (2) the base station (Node B) 802*b* requests the base station (Node B) 802*a* for information concerning the mobile station (UE) 801, using one of the methods described with respect to the above-described exemplary embodiments; (3) in response to this request, the base station (Node B) 802*a* notifies the information concerning the mobile station (UE) 801 to the base station (Node B) 802*b*; and (4) based on the information notified from the base station (Node B) 802*a*, the base station 802*b* notifies the timer length setting value to the mobile station 801. More specifically, if a handover of a mobile station to another base station occurs, the latest timer length being used by the original base station is transferred from the original base station to such another base station to which the mobile station is handed over.

According to this exemplary embodiment, even when a mobile station (UE) leaves the communication coverage of a base station (Node B) to another, it becomes possible between different base stations (Node B) to reduce signalling and to perform control of a timer which is per-mobile-station (UE) basis adaptively for determining whether the mobile station is in a deemed in-sync state or in a deemed out-of-sync state, because information concerning the mobile station (UE) is passed between the original and current (new) base stations (Node B).

Tenth Exemplary Embodiment

Figure 35:
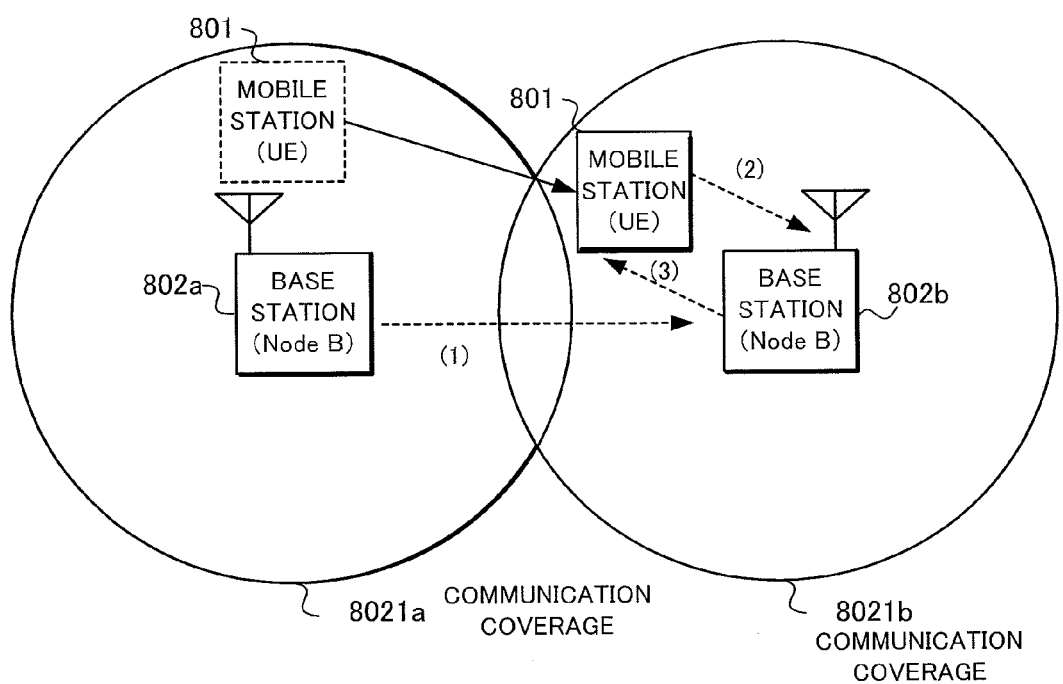
FIG. 35 is a diagram illustrating a schematic concept of a wireless communication system according to a tenth exemplary embodiment of the present invention.

FIG. 35 is a diagram illustrating a schematic concept of a wireless communication system according to a tenth exemplary embodiment of the present invention. The mobile station (UE) and the base station (Node B) of this exemplary embodiment have one of the structures of the exemplary embodiments described above. The present invention is applied in such a manner that, when the mobile station (UE) 801 moves from within the communication coverage 8021*a* of the base station (Node B) 802*a* to the communication coverage 8021*b* of the base station (Node B) 802*b*, (1) the base station 802*a* notifies to the base station 802*b* the latest length of the timer of the mobile station 801, in addition to the information necessary for a handover; (2) the mobile station 801 notifies to the base station 802*b* that it has been handed over from the base station 802*a*; and (3) the base station 802*a* notifies to the mobile station 801 the latest timer length setting value notified from the base station 802*a*. More specifically, if a handover of a mobile station to another base station occurs, the latest timer length being used by the original base station is transferred from the original base station to such another base station to which the mobile station is handed over.

According to this exemplary embodiment, even when a mobile station (UE) leaves the communication coverage of a base station (Node B) to another, it becomes possible between different base stations (Node B) to reduce signalling and to perform control of a timer which is per-mobile-station (UE) basis adaptively for determining whether the mobile station is in a deemed in-sync state or in a deemed out-of-sync state, because information concerning the mobile station (UE) is passed between the original and current (new) base stations (Node B).

First Example

An example of the present invention will now be described.

A TA is a signal obtained by detection of time synchronization and is sent from a base station to a mobile station. The mobile station corrects a propagation delay and adjusts a transmit timing by using the TA, so that a timing deviation from uplink signals sent from other mobile stations will fall within the receiver window. Time-division multiplexing of an uplink using a TA is performed in order to prevent overlapping of transmissions via uplinks from a plurality of mobile stations.

Timing control becomes necessary when:

(1) a mobile station accesses a cell for the first time, which includes an initial access and a state transition from idle to active;

(2) a mobile station accesses a cell after a long-term DTX; or (3) the base station judges that a TA must be transmitted, which situation may occur, for example, during data transmission.

If a cell (in particular, a cell with a small radius) in which overlapping of uplink signals is not expected to occur during the maximum propagation delay, timing control for uplinks may not be required.

TA commands may have different control accuracy as described below:

(1) one-bit TA command, which has low reliability but is frequently transmitted; or (2) multiple-bit TA command, which has high reliability but is infrequently transmitted.

A mobile station is not aware of the actual synchronization timing at a base station. A base station, on the other hand, can recognize whether or not a mobile station is actually in sync, from the reference signal of an uplink, data signal or the control signal.

A mobile station may be in either of the two states, which can be judged by use of a TA (TA state):

(1) IN-SYNC state; or (2) OUT-OF-SYNC state.

The mobile station determines its TA state according to the following rules:

(1) A mobile station enters an IN-SYNC state when receiving a one- or multiple-bit TA command, causing a timer called T_SYNC to start operating; and (2) A mobile station enters an OUT-OF-SYNC state when the timer T_SYNC times out.

The value of the timer T_SYNC is notified from a base station to a mobile station upon establishment or re-establishment of an RRC.

T_SYNC is controlled on a per-mobile-station basis and is optimized according to the channel status specific to each mobile station. For example, a base station can set a small value as the initial value of T_SYNC and later change it to a larger value with respect to a mobile station if the mobile station is taking much longer time than others before entering an OUT-OF-SYNC state.

A control of T_SYNC can be maintained across a handover to another cell. When a handover occurs between different base stations, the same T_SYNC value can be set before and after the handover between these base stations, by using either of the following procedures: the mobile station notifies the length of its timer to the target base station to which the mobile station is handed over, or the source base station transfers the latest timer length being used within the source cell to the target base station. When a mobile station moves from one cell to another of the same base station, the base station can set the same T_SYNC value before and after a handover.

The first to ninth exemplary embodiments can be applied to such control of T_SYNC.

In order to solve the subjects described above, a wireless communication system as described below is provided.

In a wireless communication system provided by the present invention, a base station (Node B) holds a first timer for judging whether a mobile station (UE) is in a deemed in-sync state or in a deemed out-of-sync state, one for each of M mobile stations (UE) (where M is a natural number), i.e., M irst timers in total;

with respect to uplink signals of the mth (where m is an integer between 1 and M) mobile station (UE) #m, the base station (Node B) calculates a timing advance (Timing Advance: TA) of a transmit timing, which is necessary for uplink signals from M mobile stations (UE) to synchronize with each other at the base station (Node B) and, immediately after notifying the timing advance (TA) to the mobile station (UE) #m, causes the first timer #m for judging whether the mobile station (UE) #m is in a deemed in-sync state or in a deemed out-of-sync state to operate;

immediately after being notified the timing advance (TA), the mobile station (UE) #m causes the second timer used for judging its own state to operate, adjusts a transmit timing according to the timing advance (TA), modifies the format of an uplink signal according to its own state, and transmits the resultant uplink signal; and both or either of the base station (Node B) and/or the mobile station (UE) #m adaptively determine(s) and update(s) the length of both or either of the first timer #m and/or the second timer according to the value of an indicator based on which to estimate an in-sync period in which the mobile station (UE) #m in a deemed in-sync state becomes in a deemed out-of-sync state.

The structure of the wireless communication system according to each of the exemplary embodiments will be summarized below.

The first wireless communication system has a structure wherein the base station (Node B) calculates the value of an indicator based on which to estimate an in-sync period, determines the length of both the first timer #m and the second timer of the mobile station (UE) #m so that it will be inversely proportional to the indicator value, updates the length of the first timer #m, and notifies the length of the second timer thus determined to the mobile station (UE) #m; and the mobile station (UE) #m reproduces the length of the second timer determined by the base station (Node B), and updates the length of the second timer accordingly.

The second wireless communication system has a structure wherein the base station (Node B) calculates the value of an indicator based on which to estimate an in-sync period, determines the length of the first timer #m so that it will be inversely proportional to the indicator value, updates the length of the first timer #m, and notifies the indicator value to the mobile station (UE) #m; and the mobile station (UE) #m determines the length of the second timer so that it will be inversely proportional to the reproduced indicator value, and updates the length of the second timer.

The third wireless communication system has a structure wherein the mobile station (UE) #m calculates the value of an indicator based on which to estimate an in-sync period, determines the length of both the first timer #m and the second timer so that it will be inversely proportional to the indicator value, updates the length of the second timer, and notifies the length of the first timer #m thus determined to the base station (Node B); and the base station (Node B) reproduces the length of the first timer #m determined by the mobile station (UE) #m, and updates the length of the first timer #m accordingly.

The fourth wireless communication system has a structure wherein the mobile station (UE) #m calculates the value of an indicator based on which to estimate an in-sync period, determines and updates the length of the second timer so that it will be inversely proportional to the indicator value, and notifies the indicator value to the base station (Node B); and the base station (Node B) determines and updates the length of the first timer #m so that it will be inversely proportional to the reproduced indicator value.

The fifth wireless communication system has a structure wherein the base station (Node B) and the mobile station (UE) #m individually calculate the value of an indicator based on which to estimate an in-sync period, and individually determine and update the length of the first timer #m and the second timer so that they will be inversely proportional to the indicator value.

The sixth wireless communication system has a structure wherein the mobile station (UE) #m calculates the value of an indicator based on which to estimate an in-sync period and notifies the value to the base station (Node B); the base station (Node B) determines the length of both the first timer #m and the second timer of the mobile station (UE) #m so that it will be inversely proportional to the reproduced indicator value, updates the length of the first timer #m, and notifies the length of the second timer to the mobile station (UE) #m; and the mobile station (UE) #m reproduces the length of the second timer determined by the base station (Node B), and updates the length of the second timer accordingly.

The seventh wireless communication system has a structure wherein the base station (Node B) calculates the value of an indicator based on which to estimate an in-sync period, and notifies the indicator value to the mobile station (UE) #m; the mobile station (UE) #m determines the length of both the first timer #m and the second timer so that it will be inversely proportional to the reproduced indicator value, updates the length of the second timer, and notifies the length of the first timer #m to the mobile station (UE) #m; and the base station (Node B) reproduces the length of the first timer #m determined by the mobile station (UE) #m. and updates the length of the first timer #m accordingly.

As an indicator based on which to estimate an in-sync period, for use in each wireless communication system provided by the present invention, both or either of the traveling speed of a mobile station (UE) and/or a time variation in a timing advance (TA), for example, can be used.

An example of method to determine the length of the first and second timers according to the value of an indicator is to first prepare a table which pre-defines correlations between indicator and timer length and then to determine the timer length based on the calculated indicator value and the table.

As explained in the foregoing, by adaptively controlling the length of a timer used for judging whether a mobile station is in a deemed in-sync state or in a deemed out-of-sync state on a per-mobile-station basis regarding the traveling speed, the probability can be reduced that a latency before data transmission increases when the mobile station that is actually in sync is judged to be out of sync.

While the present invention has been described by taking several preferred exemplary embodiments as examples, it should be appreciated that the invention is not limited to these exemplary embodiments but can be embodied with a variety of modifications without departing from the spirit and scope of its technical principle.

INCORPORATION BY REFERENCE

This application claims priority on the basis of Japanese Patent Application No. 2007-026203 filed as of Feb. 5, 2007, and incorporates by reference herein the disclosure thereof in its entirety.

What is claimed is:

1. A base station of a wireless communication system which performs communication between a mobile station and the base station, the base station comprising:
   a timer unit which sets a period for judging whether an uplink signal from the mobile station is synchronized; and
   a timer control unit which determines the set period for each of mobile stations and notifies the set period to each of the mobile stations.

2. The base station of claim 1, wherein the base station notifies said set period via a message which is related to a RRC connection.

3. A mobile station of a wireless communication system which performs communication between the mobile station and a base station, the mobile station comprising:
   a unit which judges whether an uplink signal to the base station is synchronized based on a set period which is determined for each of a plurality of mobile stations and notified to each of the mobile stations.

4. The mobile station of claim 3, wherein the mobile station received the set period via a message which is related to a RRC connection.

5. A method executed by at least one processor of controlling a base station of a wireless communication system which performs communication between a plurality of mobile stations and the base station, the method comprising:
   setting a period for judging whether an uplink signal from one of the mobile stations is synchronized; and
   determining the set period for each of the mobile stations and notifies the set period to each of the mobile stations.

6. A method executed by at least one processor of controlling a mobile station of a wireless communication system which performs communication between the mobile station and a base station, the method comprising:
   judging whether an uplink signal to the base station is synchronized based on a set period which is determined for each of a plurality of mobile stations and notified to each of the mobile stations.

7. A wireless communication system which performs communication between a mobile station and a base station, wherein the base station comprises:
   a timer unit which sets a period for judging whether an uplink signal from the mobile station is synchronized;
   a timer control unit which determines the set period for each of a plurality of mobile stations and notifies the set period to each of the mobile stations; and
   wherein the mobile station comprises:
   a unit which judges whether an uplink signal to the base station is synchronized based on a set period which is determined for each of the mobile stations and notified to each of the mobile stations.

* * * * *